US006226470B1

(12) United States Patent
Kohtani et al.

(10) Patent No.: US 6,226,470 B1
(45) Date of Patent: May 1, 2001

(54) METHOD AND APPARATUS FOR IMAGE FORMATION USING SWITCHABLE IMAGE GENERATORS AND DENSITY CONTROL

(75) Inventors: Hideto Kohtani, Hachioji; Hirohiko Tashiro; Takashi Nonaka, both of Kawasaki, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/413,205

(22) Filed: Oct. 5, 1999

(30) Foreign Application Priority Data

Oct. 6, 1998 (JP) .................................................. 10-297600

(51) Int. Cl.[7] .................................................. G03G 15/00
(52) U.S. Cl. .............................. 399/75; 358/1.14; 399/71; 399/127
(58) Field of Search ............................... 399/127, 75, 350, 399/9, 53, 71; 358/1.14, 1.16, 1.17

(56) References Cited

U.S. PATENT DOCUMENTS 4,962,408 * 10/1990 Masuda et al. .................. 399/350 X

* cited by examiner

*Primary Examiner*—Susan S.Y. Lee
(74) *Attorney, Agent, or Firm*—Fitzpatrick, Cella, Harper & Scinto

(57) ABSTRACT

An image formation device, such as a printer, forms an image in a transfer format. The image formation device is configured to execute a predetermined down sequence to prepare the device for the next image formation operation after completion of an image formation operation. Alternatively, when a predetermined condition is satisfied, the device is configured to execute a blank rotation sequence instead of executing the down sequence after completion of an image formation operation. The device may have the ability to form an image from different image generation sources. A determination of whether an image formation operation switches from one image generation source to using another image generation source may be based on whether the predetermined condition is satisfied. The predetermined condition may be that the sizes of the images formed using each image generation source are equal. The down sequence may include a density control for stabilizing a cleaning operation inside the device and an output density of the device. The blank rotation sequence may not include the density control. The device may also be configured to restart an image formation operation after the blank rotation sequence.

24 Claims, 19 Drawing Sheets

FIG. 4

| NAME OF SIGNAL | INITIALISM | DIRECTION OF SIGNAL |
|---|---|---|
| PRINTER POWER READY | /PPRDY | CONTROLLER ← PRINTER |
| CONTROLLER POWER READY | /CPRDY | CONTROLLER → PRINTER |
| READY | /RDY | CONTROLLER ← PRINTER |
| PRINT | /PRNT | CONTROLLER → PRINTER |
| TOP OF PAGE | /TOP | CONTROLLER ← PRINTER |
| LINE SYNC | /LSYNC | CONTROLLER ← PRINTER |
| VIDEO CLOCK | /VCLK | CONTROLLER → PRINTER |
| IVIDEO ENABLE | /VDOEN | CONTROLLER → PRINTER |
| VIDEO | /VDO | CONTROLLER → PRINTER |
| CONTROLLER CLOCK | /CCLK | CONTROLLER → PRINTER |
| COMMAND BUSY | /CBSY | CONTROLLER → PRINTER |
| COMMAND | /CMD | CONTROLLER → PRINTER |
| STATUS BUSY | /SBSY | CONTROLLER ← PRINTER |
| STATUS | /STS | CONTROLLER ← PRINTER |
| PRINTER POWER READY | /PFED | CONTROLLER ← PRINTER |
| SPEED CHANGE | /SPCHG | CONTROLLER ← PRINTER |
| PAPER DELIVERY | /PDLV | CONTROLLER ← PRINTER |
| TOP OF PAPER | /TOPR | CONTROLLER ← PRINTER |
| CONDITION CHANGE REPORT | /CCRT | CONTROLLER ← PRINTER |

METHOD AND APPARATUS FOR IMAGE FORMATION USING SWITCHABLE IMAGE GENERATORS AND DENSITY CONTROL

BACKGROUND OF THE INVENTION

1. Field of the Invention

The present invention relates to an image formation device having an image formation mechanism which requires cleaning operation and density control operation after the end of image formation operation, an image formation method, an image formation system and a storage medium which implements the image formation method.

2. Related Background Art

Up to this time, in a color copying machine which has a transfer drum and an intermediate transfer body and forms a color image by an electrophotographic method, cleaning operation has been performed after the end of image formation operation. This operation is necessary for preventing dirt from being generated in the output image of the next image formation operation because each color toner of Y, M, C or K remains behind in a photosensitive drum and a transfer belt. Further, to increase the stability of an output image, density control which stabilizes the density of the output image is also performed at the end of image formation operation.

Conversely, even in such color copying machine, many composite machines in which printer and FAX (facsimile) system functions are integrated have been proposed in recent years, and in this type of color copying machine, how the productivity as a composite machine is to be improved becomes an issue.

However, the above conventional color copying machine has the following problems.

In the cleaning operation and density control operation after the end of the above image formation operation, the operation time may also take several ten seconds. For example, if an attempt is made to output an image as a printer after the end of copy operation, the switching time is required much and the capability of a switching continuous output to which importance is attached as the productivity of a composite machine cannot help being deteriorated greatly.

SUMMARY OF THE INVENTION

In consideration of the problems in the prior art described above, an object of the present invention is to provide an image formation device which can minimize the time required before the execution of new image formation operation such as the time required for operation switching and improve productivity, an image formation method, an image formation system and a storage medium which implements the image formation method.

To attain this object, an image formation device of the present invention provides an image forming means which forms an image in a transfer format, a down sequence executing means which executes a predetermined down sequence ready for the ready image formation by the image forming means at the end of image formation operation and a blank rotation executing means which executes blank rotation that is a sequence not including the down sequence after the end of image formation operation, and executes the blank rotation instead of executing the down sequence under a predetermined condition.

Further, in an image formation device of the present invention, the image forming means can form an image from different image generation sources, and it is subject to the above predetermined condition that image formation is switched from one image generation source to the image formation based on an image from the other image generation source.

Furthermore, in an image formation device of the present invention, in case the image formation is switched from the one image generation source to the image formation based on the image from the other image generation source, it is subject to the predetermined condition that the sizes of both formation images before and after they are switched are equal.

Besides, in an image formation device of the present invention, the down sequence includes the density control for stabilizing the cleaning operation inside the device or the output density of the device.

Further, in an image formation device of the present invention, the blank rotation is a sequence not including the density control for stabilizing the cleaning operation inside the device and the output density of the device.

Furthermore, an image formation device of the present invention comprises an image formation operation restarting means which restarts the image formation operation after the blank operation.

Besides, an image formation method of the present invention, wherein the image formation processing which forms an image in a transfer format and the down sequence execution processing which executes a predetermined down sequence ready for the next image formation by the image forming means after the end of image formation operation, provides the blank rotation execution processing which executes blank rotation that is a sequence not including the down sequence after the end of image formation operation, and performs the blank rotation instead of executing the down sequence under a predetermined condition.

Further, an image formation system of the present invention comprises a data sender which sends image data and an image formation device having an image forming means which forms an image of the image data sent from the data sender in a transfer format and having a down sequence executing means which executes a predetermined down sequence ready for the next image formation by the image forming means after the end of image formation operation. The image formation system provides a blank rotation executing means which executes blank rotation that is a sequence not including the down sequence after the end of image formation operation and executes the blank rotation instead of executing the down sequence under a predetermined condition.

Furthermore, a storage medium of the present invention stores the program which can be read by a computer and which implements an image formation method that performs the image formation processing which forms an image in a transfer format and the down sequence execution processing which executes a predetermined down sequence ready for the next image formation by the image forming means at the end of image formation operation, and the image formation method comprises a step of executing blank rotation that is a sequence not including the down sequence under the predetermined condition after the end of the image formation operation.

BRIEF DESCRIPTION OF THE DRAWINGS

FIG. 4 is a detailed diagram of a video I/F 61;

DESCRIPTION OF THE PREFERRED EMBODIMENT

The embodiments of the present invention are described below with reference to the drawings.

[Entire Configuration]

Figure 1:
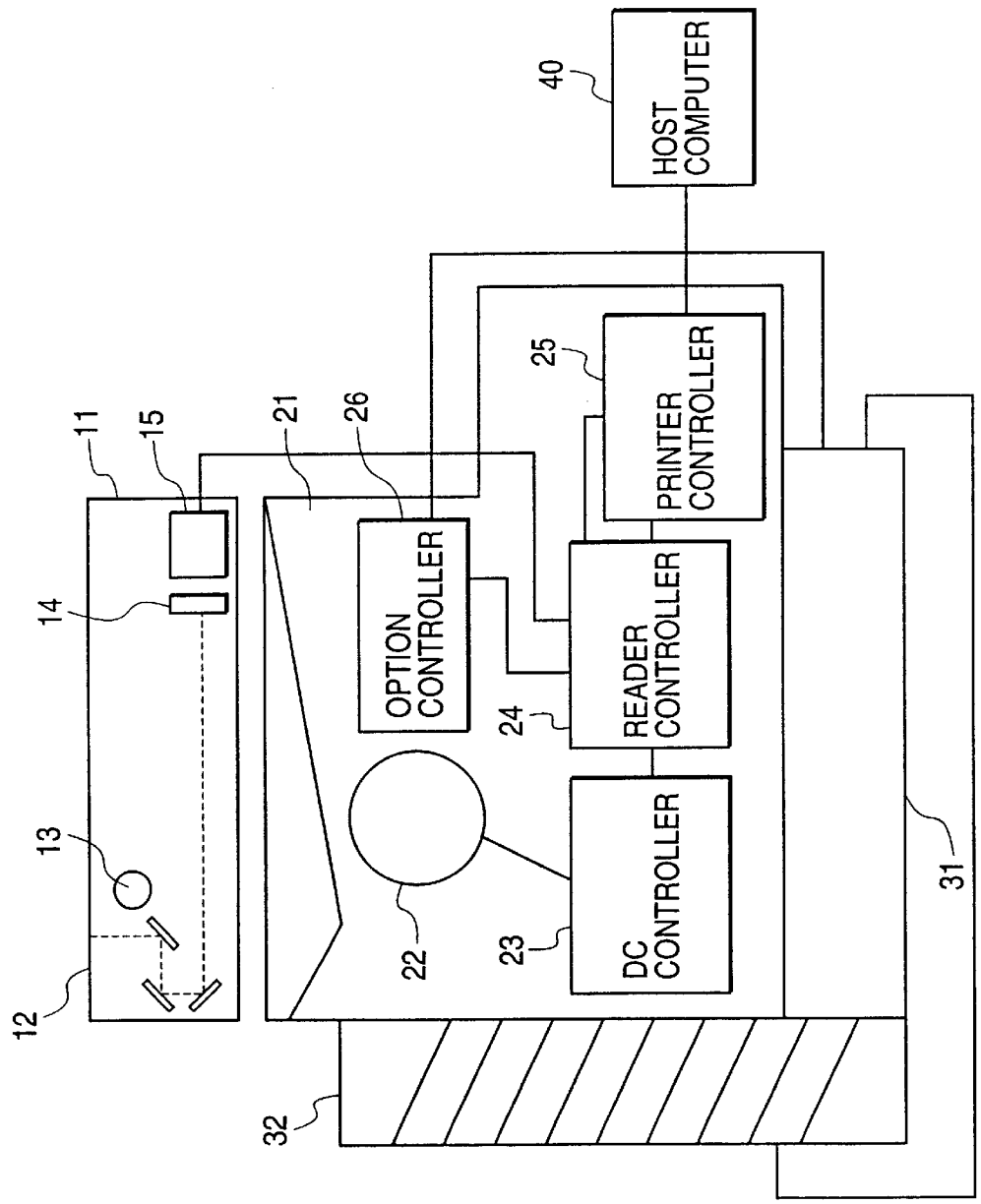
FIG. 1 is a block diagram showing the entire configuration of a color formation device according to one embodiment of the present invention.

FIG. 1 is a block diagram showing the entire configuration of a color image formation device according to one embodiment of the present invention.

In FIG. 1, 11 is a reader unit, and an original stand 12, a light source 13, a photoelectric converting means 14 and an analog-to-digital converting means 15 are installed in this reader unit 11.

Further, 21 is a printer main unit, and an image formation unit 22, a DC controller 23 which controls the printer sheet carrying and image formation, a reader controller 24, a printer controller 25 and an option controller 26 are built in this printer main unit 11.

31 is a sheet feed cassette deck which can be added as an option and 32 is a sorter which can be added as an option. These sheet feed cassette deck 31 and sorter 32 are controlled by the option controller 26.

Besides, 40 is a host computer connected to the printer controller 25 in one-to-one correspondence or via a network.

The reader controller 24 has the functions of controlling the processing of a digital image output from the analog-to-digital converting means 15, controlling a motor not illustrated for reading an original and controlling the communication between the DC controller 23 and the printer controller 25.

In this embodiment, the reader controller 24 is arranged in the printer main unit 21 so that an external cable for controlling the communication between the DC controller 23 and the printer controller 25 will not be provided.

[Configuration between Printer Controller and Printer]

In this embodiment, a reader controller is connected between a printer controller and a printer engine and processing is performed between the printer controller and the printer engine. First, the configuration of the printer controller and the printer engine which becomes the prerequisite is described here showing the configuration in which a reader controller is not installed.

Figure 2A:
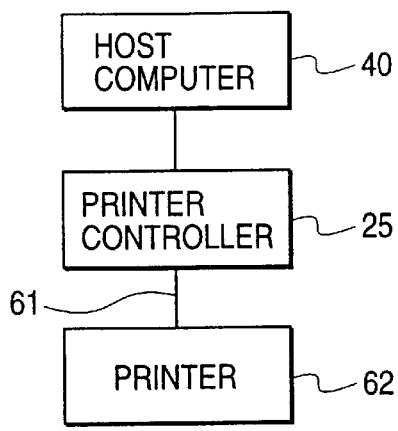
FIGS. 2A and 2B are block diagrams showing the main configuration of a color image formation device in which a reader controller is not installed.
Figure 2B:
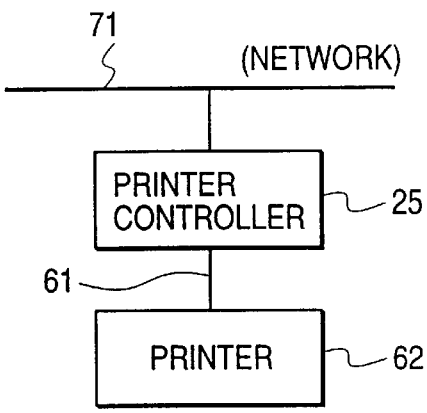

FIGS. 2A and 2B are block diagrams showing the main configuration of a color image formation device in which a reader controller is not installed.

61 of FIGS. 2A and 2B is a video I/F and performs the communication between a printer engine 62 described later and the printer controller 25. The details about each signal of this video I/F 61 are described later.

62 is a printer engine and forms an electric image signal received via the I/F 61 so as to be observed by the eye. After the result is transferred and fused on a sheet of recording paper, it is output. To attain these image formation sequences, the printer engine 62 detects the condition of the printer and reports it to the printer controller 25 in addition to controlling various loads.

25 is a printer controller and receives the data sent via the host computer 40 or a network 71. This data is sent in various formats such as bit map data and data written in a PDL (Page Description Language). This data is expanded on a memory and transfers data to the engine printer 62 as raster format data. Thus the data created by the host computer 40 or the data sent via the network 71 can be output to the printer.

Figure 3:
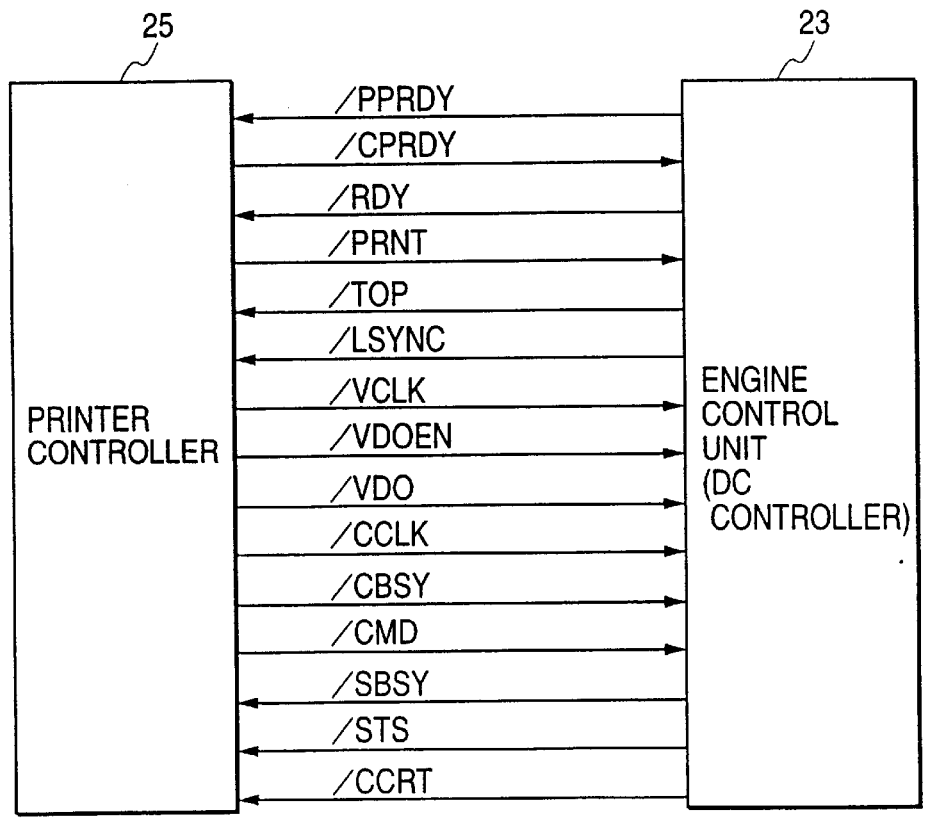
FIG. 3 is a diagram of the principal part showing the details of a video I/F 61.

Next, the details about the video I/F 61 which connects the printer controller 25 and the printer engine 62 are described using FIGS. 3 and 4.

25 of FIG. 3 shows a printer controller. 23 is an engine control unit (DC controller) which controls the engine inside the printer engine 62. Signals shown in FIG. 3 are exchanged between the printer controller 25 and the engine control unit 23. Besides, FIG. 4 shows a list of signals of this video I/F 61. In particular, only typical signals shown in FIG. 3 are described here.

First, /PPRDY is a signal indicating that the communication with the printer controller 25 is enabled after the power is supplied to the printer engine 25 and processing such as setup is completed. /CPRDY is a signal indicating that the communication with the engine control unit 23 is enabled after the power is supplied to the printer engine 25 and processing such as setup is completed.

The /RDY signal is a signal indicating that print operation is enabled after the engine control unit 23 receives a print start instruction (/PRNT signal described later) from the printer controller 25. The conditions under this signal becomes true only when each unit of the printer engine 62 is normally operating, such as (1) the temperature inside a fixing unit reaches a predetermined temperature, (2) no recording paper remains behind in the printer and (3) a polygonal mirror is rotating at a predetermined speed.

The /PRNT signal is a signal through which the printer controller 25 instructs the engine control unit 23 to start or continue print operation. The /TOP signal is a synchronous signal which is transferred from the engine control unit 23 to the printer controller 25 and becomes the vertical scanning standard of an image. This /TOP signal is output in a predetermined time after the /PRNT signal is output from the printer controller 25.

The /LSYNC signal is a synchronous signal the printer controller 25 uses as the horizontal scanning standard and is output to the printer controller 25 in a predetermined time after the /PRNT signal is output from the printer controller 25 in the same manner as the /TOP signal. The /VCLK signal is a synchronous clock for the /VDOEN and /VDO signals described later and generates a frequency clock which corresponds to an image signal from the printer controller 25.

The /VDOEN signal is a signal which controls entering of an image signal the printer controller 25 outputs to the engine control unit 23. The engine control unit 23 detects that this /VDOEN signal is True or False synchronizing with the /VCLK signal. In case of True, the image signal is entered and in case of False, it is not entered.

The /VDO signal is image data. The printer controller 25 outputs this /VDO signal based on the /TOP signal in the vertical direction and the /LSYNC signal in the horizontal direction synchronizing with the /VCLK signal. The /CCLK signal is a synchronous clock used when the printer controller 25 sends a serial command to the engine control unit 23 and when the engine control unit 23 returns a serial status to the printer controller 25, and is output from the printer controller 25.

The /CBSY signal is a signal indicating to the engine control unit 23 that the printer controller 25 is sending a serial command using the /CMD signal described later. The /CMD signal is a signal used when the printer controller 25 sends serial information to the engine control unit 23, and this serial information is called a command. The /SBSY signal is a signal indicating to the printer controller 25 that the engine control unit 23 is returning a serial status using the /STS signal.

The /STS signal is a signal used when the engine control unit 23 returns serial information to the printer controller 25, and this serial information is called a status. The /CCRT signal is a signal for reporting a printer status to the printer controller 25 when it is changed. When the printer controller 25 receives this report signal, it issues a command to inquire about how the condition on the side of the engine is changed using the /CMD signal and the engine control unit 23 reports the condition to the engine using the /STS signal.

Figure 5:
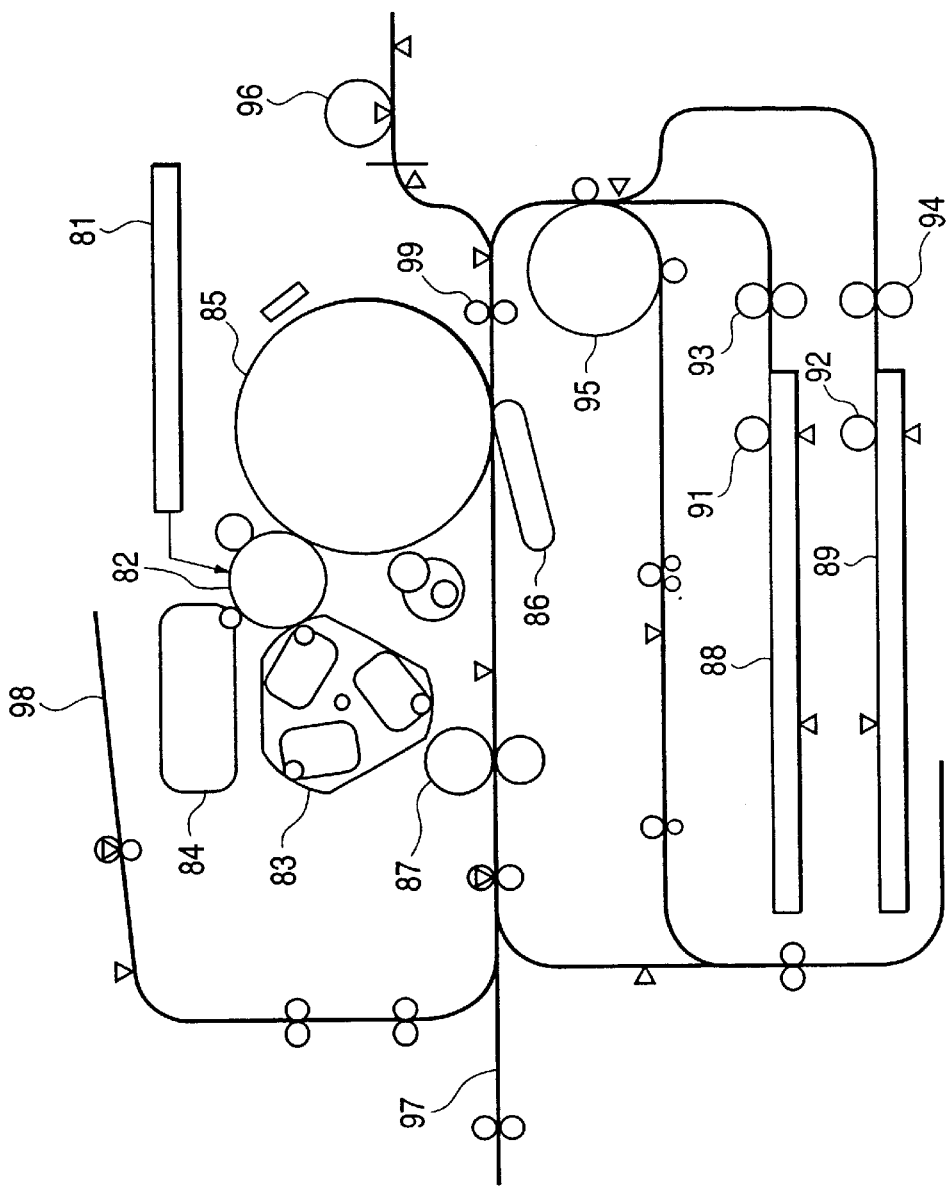
FIG. 5 is a diagram of the sheet carrying for a printer 62.

Next, the printer engine the engine control unit 23 controls is described using FIG. 5. FIG. 5 is a diagram in which the internal configuration of the printer is shown laying stress on sheet carrying.

81 of FIG. 5 is a scanner. After the scanner receives the image signal /VDO sent from the printer controller 25 and converts it to laser beam, a photosensitive drum 82 is irradiated with it and an image is formed on the photosensitive drum 82. While the photosensitive drum 82 is rotating counterclockwise, it reaches a developing unit 83 and a black developing unit 84.

The developing units 83 and 84 load (develop) toner on the photosensitive drum 82 in accordance with an electric charge charged on the photosensitive drum. When an image is black and white, only the black developing unit 84 is operated, and when it consists of colors, both the developing units 83 and 84 are used. Then the image generated on the photosensitive drum 82 is transferred to an intermediate transfer body 85 which is rotating clockwise. This intermediate transfer body 85 rotates once to develop black toner in the black and white mode and rotates four times to develop yellow, magenta, cyan and black in the color mode.

Conversely, the recording paper fed by a pickup roller 91 or 92 from a upper cassette 88 or a lower cassette 89 is carried in accordance with a sheet feed roller 93 or 94 and further carried to the front of a registration roller 99 by a carrying roller 95. Then, after the image formation on the intermediate transfer body 85 is completed, the recording paper is carried between the intermediate transfer body 85 and a transfer belt 86 by the registration roller 99. As soon as the recording paper is reached here, the transfer belt 86 touches the intermediate transfer body 85 and toner is transferred to the recording paper. An image transferred to the recording paper is fused on the recording paper due to heat and pressurization by a fusing roller 87.

The recording paper on which an image is fused is carried to either a face-up sheet discharge port 97 or a face-down sheet discharge port 98 previously designated by the printer controller 25 and is discharged.

By the above image formation operation, a black and white image or a color image is recorded on a sheet of recording paper. In a color printer having the above configuration, the operation which is independent of the image formation operation called a down sequence including cleaning operation and density control is executed. It is described below.

The cleaning operation after the image formation in a down sequence traces the following procedure, for example.

In other words, when the transfer to the final recording paper in the image recording of a plurality of pages is completed, the operation which cleans each color toner remaining behind on the photosensitive drum 82, the intermediate transfer body 85 and the transfer belt 86 is started. At normal image formation, toner is transferred from the developing units 83, 84 to the photosensitive drum 82 and from the photosensitive 82 to the intermediate transfer body 85, then from the intermediate transfer body 85 to the recording paper on the transfer belt 86. For cleaning, to collect the toner left in each unit in a discharge toner tray not illustrated, reverse potential is applied at image formation. If such operation is performed every colors, almost the same time as the color image formation becomes necessary.

Such cleaning operation can also be omitted if an image with the same size is continuously output in a plurality of pages. However, if an attempt is made to switch an image size during output, the portion beyond the image area after switching may be stained and a fault such as scattering of hard-to-clean toner may be caused. Accordingly, in a color image formation device, when the image size is switched, cleaning may be inhibited from being executed or the switching of the image size be inhibited during the same sequence.

Further, in a down sequence, density control forms a specific image pattern on the intermediate transfer body 85 or the photosensitive drum 82 and changes various process parameters such as charging, exposure, development and transfer based on a value read by a density sensor not illustrated, then sets image formation conditions for appropriate density. For the operation which forms and reads the pattern, the photosensitive drum 82 and the intermediate transfer body 85 need be rotated without forming an image and moreover the operation must be executed independently of the above cleaning operation.

To perform these down sequences, it takes some time until a device is stopped after an image is formed. For example, assume that the circumferential length of the intermediate transfer body 85 is 500 mm and the process speed inside the device is 100 mm per second. If cleaning is performed for four colors of Y. M, C and K and density control is performed, the down sequence of at least 5×4+5=25 seconds is excessively required because it takes 500/100=5 seconds for one circumference of the intermediate transfer body 85.

Consequently, the image information sent from the printer controller 25 can be output including the down sequence.

Figure 6:
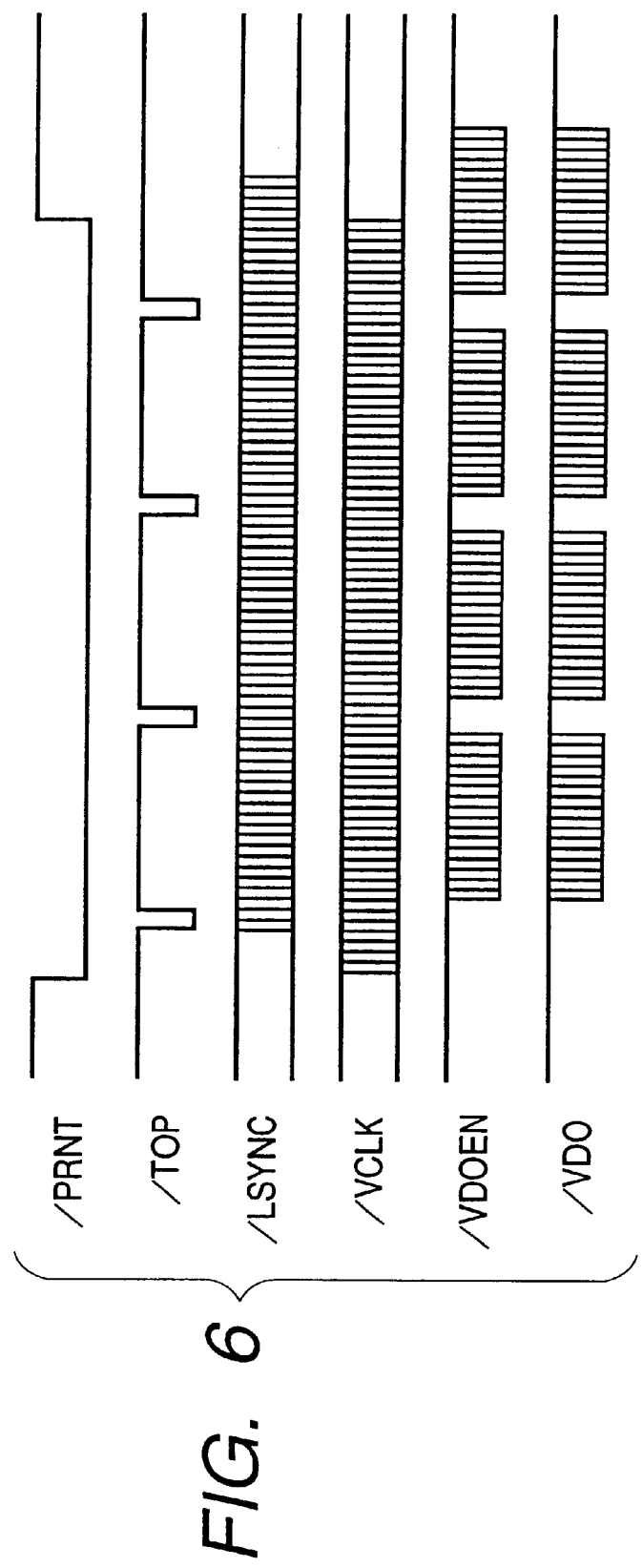
FIG. 6 is a timing diagram for signals exchanged between video I/F 61.

Next, timing of signals exchanged between the video I/F 61 is shown in FIG. 6. This shows the signal explanation of the video I/F 61 described previously in accordance with a lapse of time.

First, when the preparation for the image information of the printer controller 25 is completed, the /PRNT signal is set Low (True) and is transmitted to the engine control unit 23. Simultaneously with this, the image synchronous signal /VCLK signal used for the transfer of an image signal is also generated. In response to it, when the engine control unit 23 performs various settings inside the printer to enable acceptance of an image, the /TOP signal and the /LSYNC signal are output to the printer controller 25. Together with the vertical synchronous signal /TOP and horizontal synchronous signal /LSYNC, the printer controller 25 transfers the image signal /VDO and the image enable signal /VDEON to the engine control unit 23.

Figure 7:
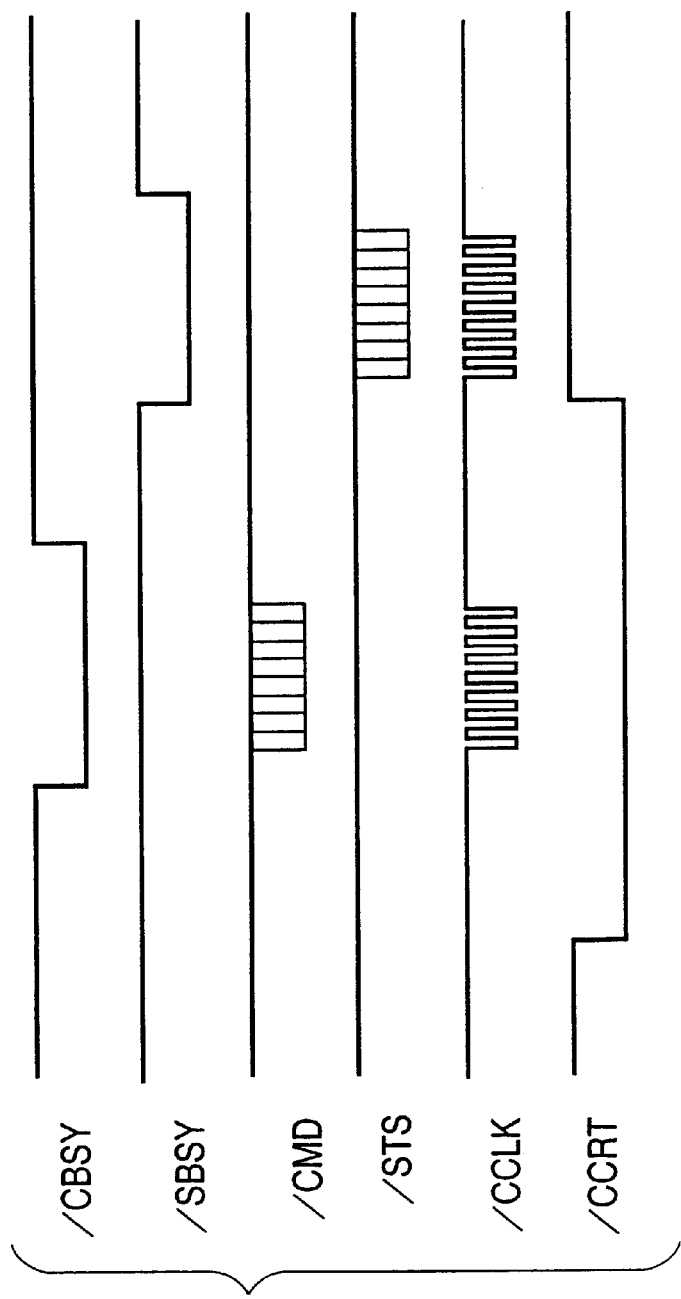
FIG. 7 is a timing diagram of the communication between a printer controller 25 and an engine control unit 23.

Next, how commands and status are being exchanged during these print operations in the serial communication is described using FIG. 7. FIG. 7 is a diagram showing timing of the communication between the printer controller 25 and the engine control unit 23.

First, the case where the lowest /CCRT signal is not used is described. When the printer controller 25 should like to issue a command to the engine control unit 23, the /CBSY signal is set Low (True) and command data is sent to the /CMD signal synchronizing with the clock signal /CCLK. After the engine control unit 23 which receives it checks that the /CBSY signal is High (False), /SBSY is set Low (True) and the status data on the side of the engine which corresponds to the command is sent to /STS synchronizing with the /CCLK signal generated from the printer controller 25. The printer controller 25 receives this status data and continues or interrupts print control according to the state.

Next, the /CCRT signal is described. This signal goes Low (True) if a change occurs in the condition on the side of the engine the printer controller 25 designates previously. For example, assume that the printer controller 25 is preset with /CMD so as to validate the /CCRT signal if no paper is generated. Then assume that there is a sheet of remaining recording paper and the printer controller 25 issues a printout request for two sheet of recording paper.

For the first recording paper, print sequence operation is normally processed without causing any problem. However, because the second recording paper cannot be found, the printer engine side detects the change of the condition and changes the /CCRT signal from High to Low when the image formation of the second recording paper is started. This signal is transmitted to the printer controller 25. When the printer controller 25 detects this, it immediately issues a command which requests the sheet feed unit paper existence status to the engine control unit 23 to know that no paper occurs in which sheet feed cassette. Accordingly, the engine control unit 23 returns no paper cassette status to the controller 25. The /CCRT signal is cleared to High at the timing at which the /SBSY signal to which the status is returned goes Low.

Figure 8:
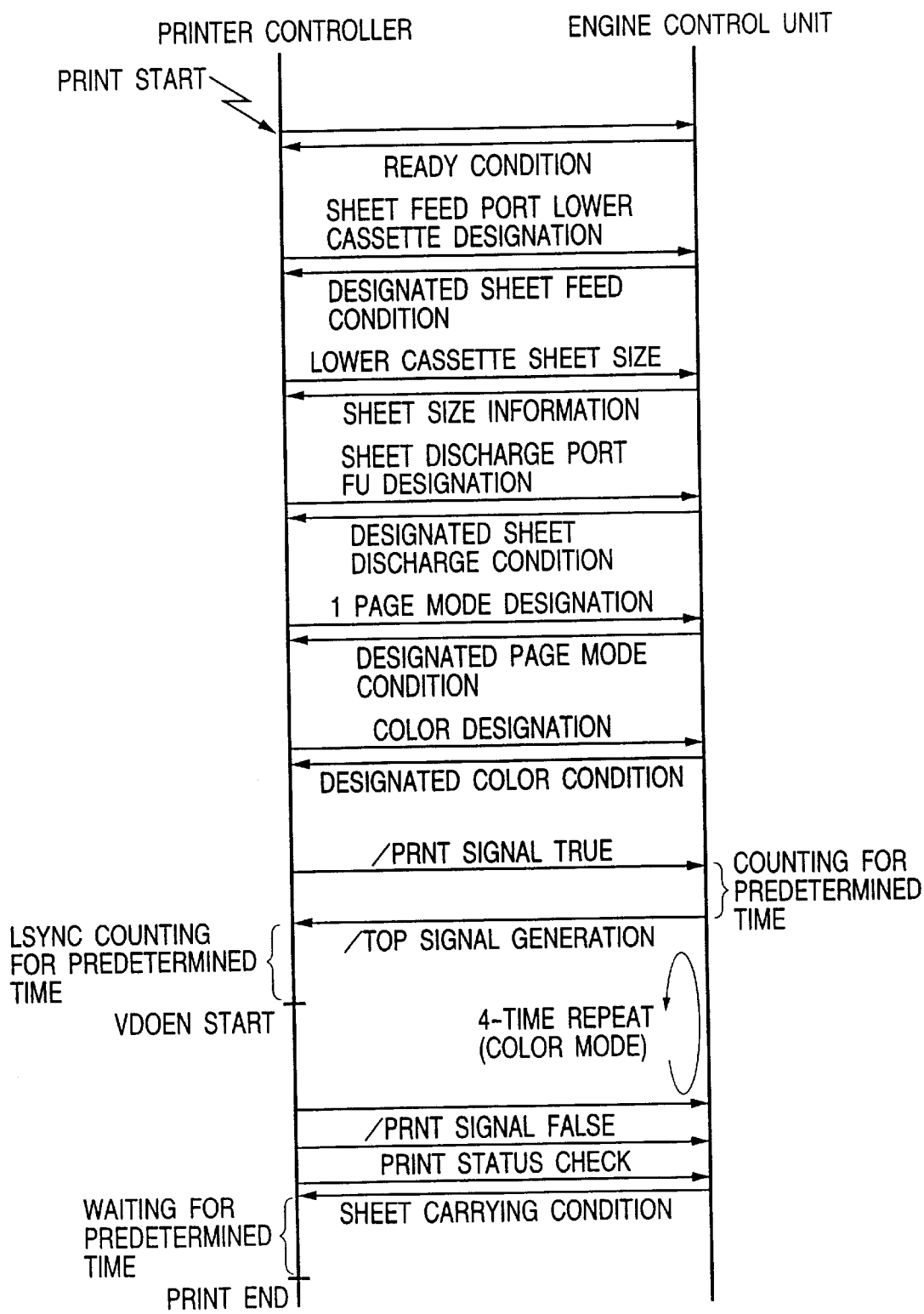
FIG. 8 is a sequence diagram showing the serial communication at print operation.

The print operation is described here showing exchange of the commands/status of the printer controller 25 and the engine control unit 23 in FIG. 8 more specifically. This assumes an color output.

When a print start request is generated, the printer controller 25 performs image data conversion processing and checks the printer ready condition for the engine control unit 23. Then a command which designates the sheet feed stage of recording paper is issued. Further, a command which requests a size of recording paper in the designated cassette is issued. The engine control unit 23 returns the corresponding status to a series of these commands.

Subsequently, a sheet discharge port is decided with a command which designates the sheet discharge port and a page mode designation command which designates how many pages of images are to be formed is issued. Finally, by issuing a command which designates the monochrome or color mode, all settings on the side of the printer are completed.

Then, the printer controller 25 generates the print request /PRNT signal for the engine control unit 23. In response to this, the /TOP signal is returned from the engine control unit 23 for a predetermined time. By making the vertical scanning direction synchronize with this /TOP signal and the horizontal scanning direction synchronize with the /LSYNC signal then matching the /VDO signal with /VCLK, an image is transferred to the engine control unit 23. In this case, because the color mode is set, the /TOP signal is generated four times and an image for four colors C, M, Y and K will be formed.

Further, after the final /TOP signal is generated, the /PRNT signal restores High (False). Accordingly, the engine control unit 23 detects that a print request is completed and moves to postprocessing such as the cleaning operation of the intermediate transfer body. Further, after the transferred recording paper passes through the fusing roller 87, it is discharged to the designated sheet discharge port. Finally, after the printer controller 25 checks no recording paper carrying state (sheet discharge end) for the engine control unit 23, it causes a print end and waits in the ready condition until the next print request is generated.

If an illegal condition such as a recording paper jam, no recording paper described above, or door opening by a user is generated during the above operation, a printer error is immediately transmitted from the engine control unit 23 to the printer controller 25 using the above /CCRT signal. The printer controller 25 will perform counteraction processing which corresponds to the error.

The above is the processing performed between the printer controller 25 and the printer engine (engine control unit 23).

Figure 9:
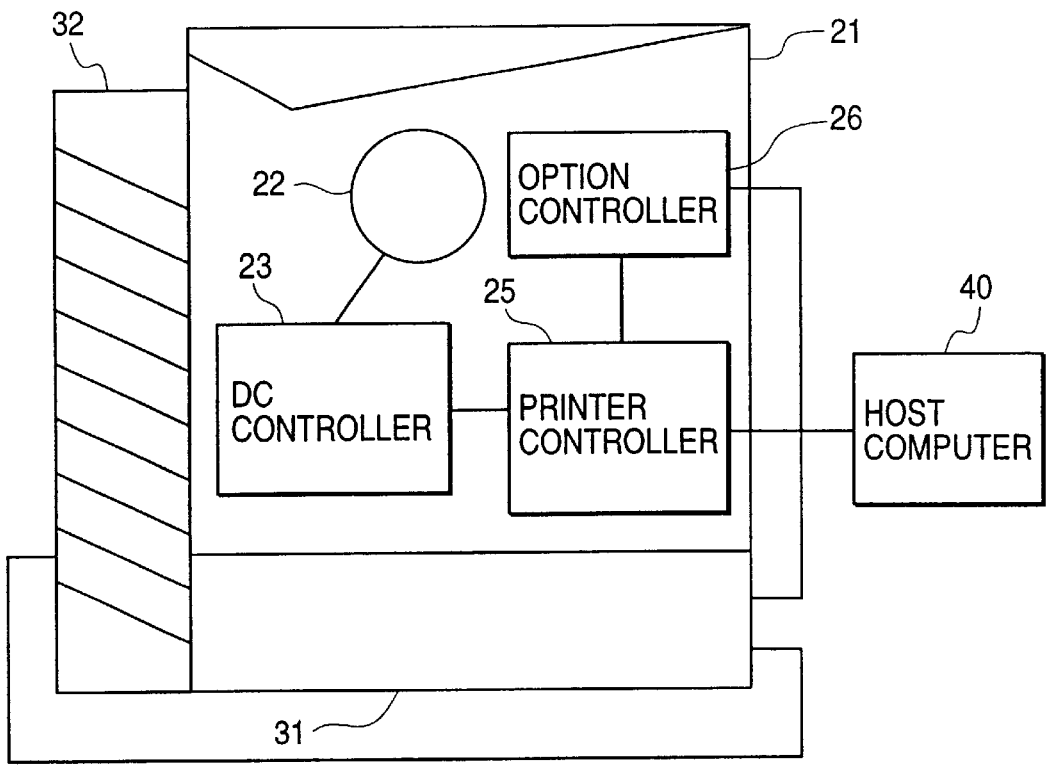
FIG. 9 is a configuration diagram of the principal part of a color image formation device according to an embodiment.

FIG. 9 is a configuration diagram of the principal part of a color image formation device in which a reader controller is not installed, and the same code is assigned to elements common to FIG. 1.

In FIG. 9, 21 is a printer main unit. 23 is a DC controller which controls the sheet carrying and image formation of the printer and 22 is an image formation unit. 25 is a printer controller and is built in the printer main unit 21. Further, 40 is a host computer connected in one-to-one correspondence or via a network. 31 is a sheet feed cassette deck which can be added as an option and 32 is a sorter which can be added as an option. 26 is an option controller which controls the option cassette deck 23 and the option stesorter 32.

[Configuration of Printer Controller and Option Controller]

Figure 10:
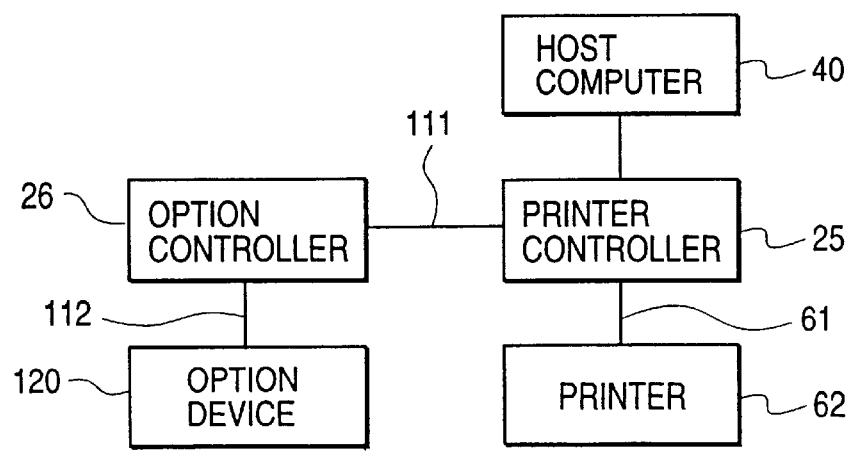
FIG. 10 is the entire configuration diagram in which an option controller is connected.

Next, as shown in FIG. 9, the entire overview when an option controller and an option device are connected is described using FIG. 10. FIG. 10 is the entire configuration diagram when the option controller is connected.

111 is an option I/F and performs the communication between the printer controller 25 and the option controller 26. The printer controller 25 can control an option device 120 such as the sheet feed cassette deck 31 and the sorter 32 which can be added as an option by controlling the option controller 26.

112 is a paper handling I/F and performs the communication between the option controller 26 and the option device 120. Because the printer controller 25 can control the option device 120 by the option I/F 111, a detailed description about the paper handling I/F 112 is omitted in this embodiment.

Figure 11:
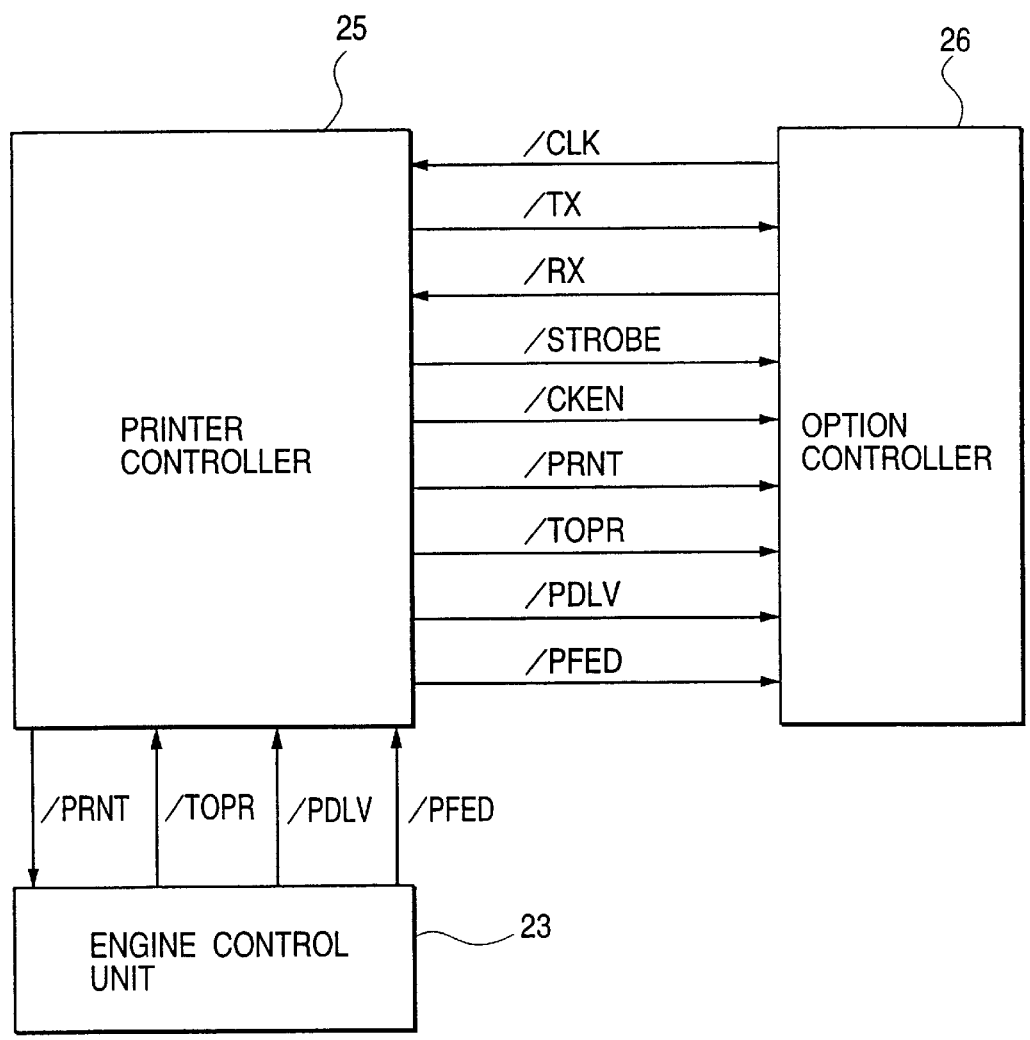
FIG. 11 is a diagram showing main signals exchanged between a printer controller 25 and an option controller 26.

Next, signals used in the option I/F 111 are described using FIG. 11. FIG. 11 is a diagram showing main signals exchanged between the printer controller 25 and the option controller 26.

The CLK signal of FIG. 11 is a synchronous clock for communication control and is a signal transferred from the option controller 26 to the printer controller 25. The /TX signal is a data signal for communication control and is a signal transferred from the printer controller 25 to the option controller 26. This /TX signal indicates addressing of the shared memory inside the option controller 26 and write data to the shared memory.

The /RX signal is a data signal for communication control and is a signal transferred from the option controller 26 to the printer controller 25. This /RX signal indicates the read data from the shared memory inside the option controller 26 and data such as parity information and access completion information.

The /STROBE signal is a communication enable signal for communication control and is a signal transferred from the printer controller 25 to the option controller 26. This signal performs communication between True and True. The /CKEN signal is a clock enable signal for communication control and is a signal transferred from the printer controller 25 to the option controller 26. This /CKEN signal indicates to the option controller 26 that the printer controller 25 can receive the /CLK signal and controls 8 bits as a unit.

The /PRNT signal is a signal defined on the video I/F 61. The /PRNT signal is a signal through which the printer controller 25 instruct the engine control unit 23 to start or continue print operation and is also supplied to the option controller 26. The /TOP signal is a signal which is defined on the video I/F 16 and transferred from the engine control unit 23 to the printer controller 25, then passes through the option controller 26. This signal shows timing at which the print sheet waiting at a registration roller is recarried.

The /PDLY signal is a signal which is defined on the video I/F 61 and transferred from the engine control unit 23 to the printer controller 25, then passes through the option controller 26. This /PDLY signal shows timing at which a print sheet is discharged from the printer engine 62. The /PFED signal is a signal which is defined on the video I/F 61 and transferred from the engine control unit 23 to the printer controller 26. This /PFED signal passes through the option controller 26 and is output only when the sheet feed unit is designated for an option input device. The signal indicates timing at which the print sheet is fed from the option input device to the printer.

Figure 12:
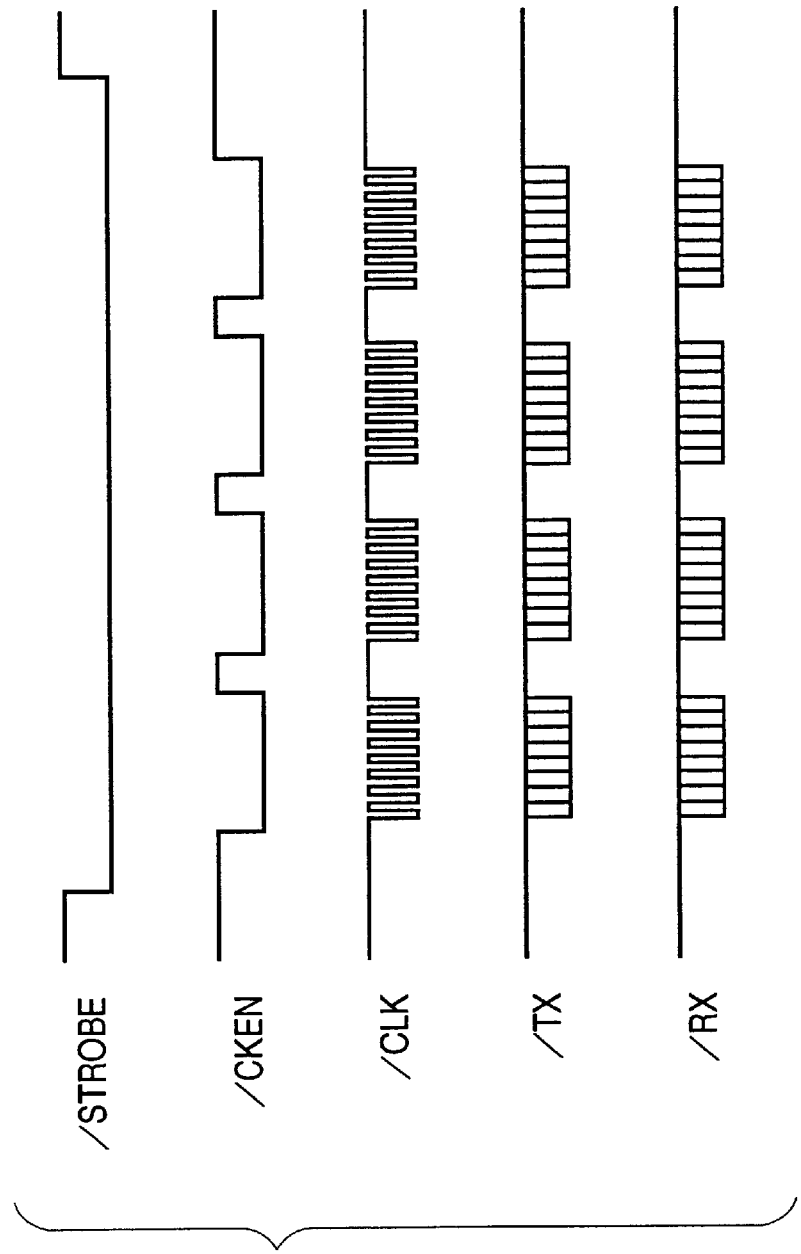
FIG. 12 is a timing diagram of the serial communication between printer controller 25 and an option controller 26.
Figure 13:
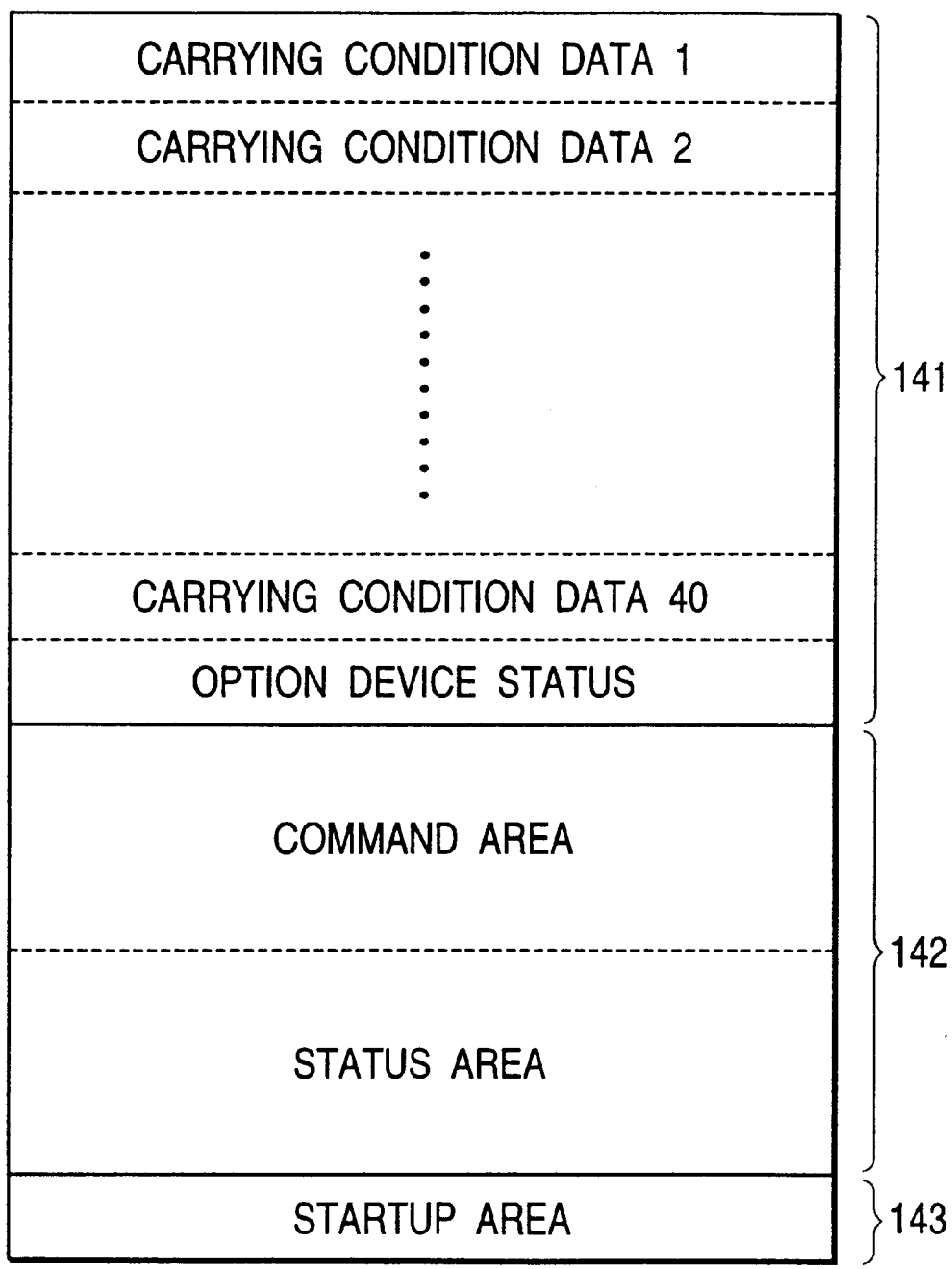
FIG. 13 is a diagram showing the data storage format of the shared memory inside an option controller 26.

FIG. 12 is a timing diagram of the serial communication between the printer controller 25 and the option controller 26.

The printer controller 25 sets the /STROBE signal True while it is performing communication. When the printer controller 25 sets the /CKEN signal True, the /CLK signal is supplied from the option controller 26 and data is sent from the printer controller 25 to the option controller 26 using the /TX signal. Simultaneously with this, the printer controller 25 receives data from the option controller 26 using the RX signal. Send and receive data is used to read and write the shared memory inside the option controller 26.

The printer controller 25 controls the option controller 26 by writing and reading data to and from the shared memory inside of the option controller 26. The inside of the shared memory is divided into a carrying condition management area 141, a command and status management area 142 and a startup area 143.

The carrying condition management area 141 is an area representing the information required for sheet carrying every print image and contains 40 images. The data for one print image contains the data showing a sheet feed port, a sheet discharge port, a sheet size, a sheet discharge mode and the sheet carrying condition of the option device 120. The printer controller 25 writes the sheet feed port, sheet discharge port, sheet size and sheet discharge mode in the carrying condition management area 141 which corresponds to every print image. The option controller 26 judges the condition of the option device 120 and writes the condition of the sheet carrying in the carrying condition management area 141 which corresponds to every print image. By using the area for these 40 images in a ring shape, the latest information about the 40 images can always be shared by the printer controller 25 and the option controller 26. Further, the area to which the status of each option device 120 is reported also exists in the carrying condition management area. According to this status, the printer controller 25 can identify a state such as no paper, a jam, and a fault while the option device 120 is waiting and sleeping.

The command and status control area 142 controls the command and status between the printer controller 25 and the option controller 26. Command data is written from the printer controller 25 to the option controller 26 and the option controller 26 writes the status data which corresponds to commands. Some commands include a command which inquires about the condition of the option device and instructs the operation for the option device 120.

The startup area 143 is used to initialize the communication between the printer controller 25 and the option controller 126.

Figure 14:
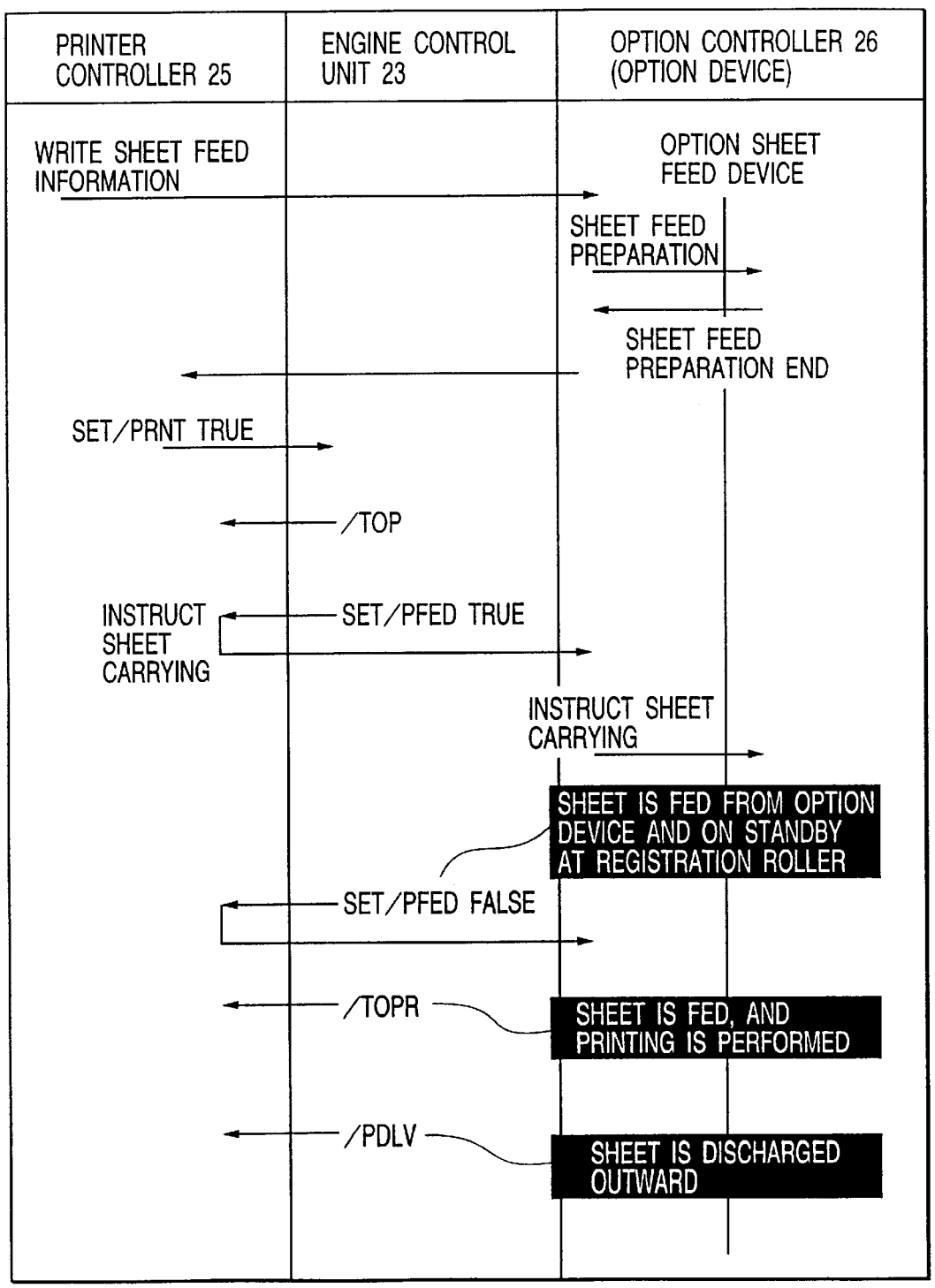
FIG. 14 is a timing diagram of the sheet feed operation in an embodiment.

FIG. 14 is a timing diagram of the sheet feed operation in this embodiment. Using this diagram, the timing of the signal among the printer controller 25, the engine control unit 23 and the option controller 26 at operation is described.

First, the printer controller 25 writes sheet feed information in the carrying condition management area 141 and instructs a sheet feed preparation. When the printer controller 26 instructs the option device 120 to prepare for sheet feed and the sheet feed preparation is completed, the option controller 26 allows a print permission flag in the carrying condition management area 141.

The printer controller 25 detects that the print permission flag is allowed in the carrying condition management area 141 and sets the /PRNT signal True for the engine control unit 23.

The engine control unit 23 returns the /TOP signal to the printer controller 25 after a predetermined period and an image is transferred to the control unit 23 synchronizing with this /TOP signal as described previously. The engine control unit 23 outputs the /PFED signal to the printer controller 25 in a predetermined period after it issues the /TOP signal and the print controller 25 instructs the option controller 26 to carry a sheet to the engine.

The option controller 26 instructs the option sheet feed device 31 (FIG. 1) to start the sheet carrying in the printer engine. When the carried sheet forms a loop by a registration roller and waits, the engine control unit 23 sets the /PFED signal False. Meanwhile, an image is formed on the intermediate transfer body 85. In a predetermined period after the /TOP signal is output, the engine control unit 23 refeeds the sheet which is waiting by the registration roller and outputs the /TOPR signal to the printer controller 25. In a predetermined period after the TOPR signal is output, the engine control unit 23 outputs the /PDLV signal. This signal indicates that a sheet is discharged outward.

If an illegal condition such as a jam of a recording sheet and door opening by a user is generated in the option device 120 during above operation, an error inside the option device 120 is immediately transmitted from the option controller 26 to the printer controller 25 using the option device status of the carrying condition management area 141 described previously. Accordingly, the printer 25 performs counteraction processing which corresponds to the error.

Further, if an illegal condition such as a jam of a recording sheet in the engine control unit 23 and door opening by a user, the printer controller 25 receives a notice from the engine control unit 23 and performs the processing which corresponds to the notice, then at the same time, instructs a command which stops the operation to the option controller 26. The option controller 26 stops the operation of the option device 120 with the command which starts the operation.

[Configuration in Which a Reader Controller is Installed]

Next, the case (configuration example of FIG. 1) where a reader controller which optically reads not only the image data output from the printer controller 25 but also an original image on a sheet and converts them to digital signals and then outputs them is installed based on the data transferred from the host computer 40, is described.

Figure 15:
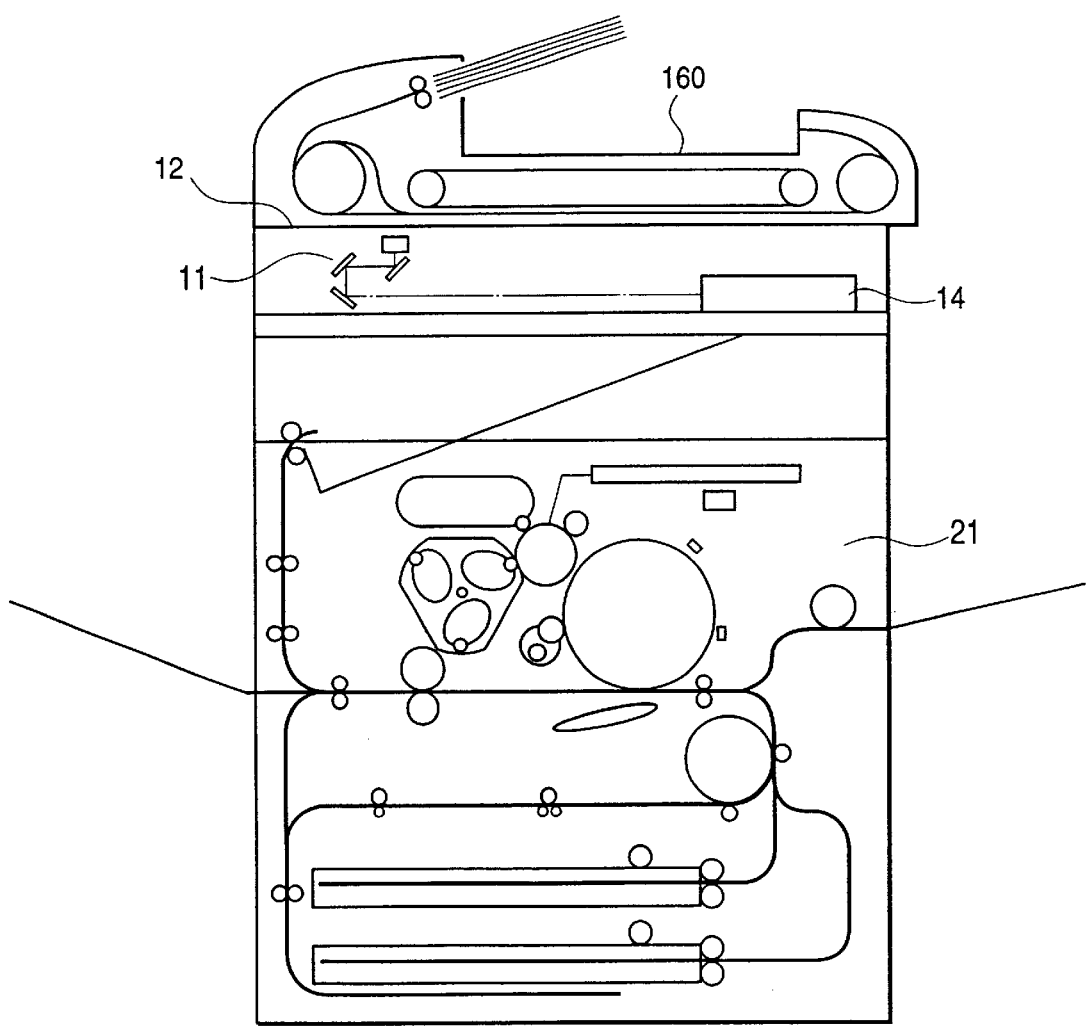
FIG. 15 is a sectional view showing the configuration of a color image formation device according to an embodiment.

FIG. 15 is a cross-sectional diagram showing the configuration of a color image formation device according to this embodiment, and a specific configuration example of the color image formation device shown in FIG. 1. However, the sorter 32 is omitted.

In FIG. 15, 160 is an original feed device for carrying an original including that which is to be optically read. This original feed device 160 is driven synchronizing with the optical reading device (reader unit) 11 and an original image is shifted on the original stand glass 12 by the feed device 160. Then the optical reading device 11 scans the image moving in the horizontal direction of the diagram and sends the reflected light to which appropriate optical processing applies to the photoelectric conversion unit 14.

Figure 16:
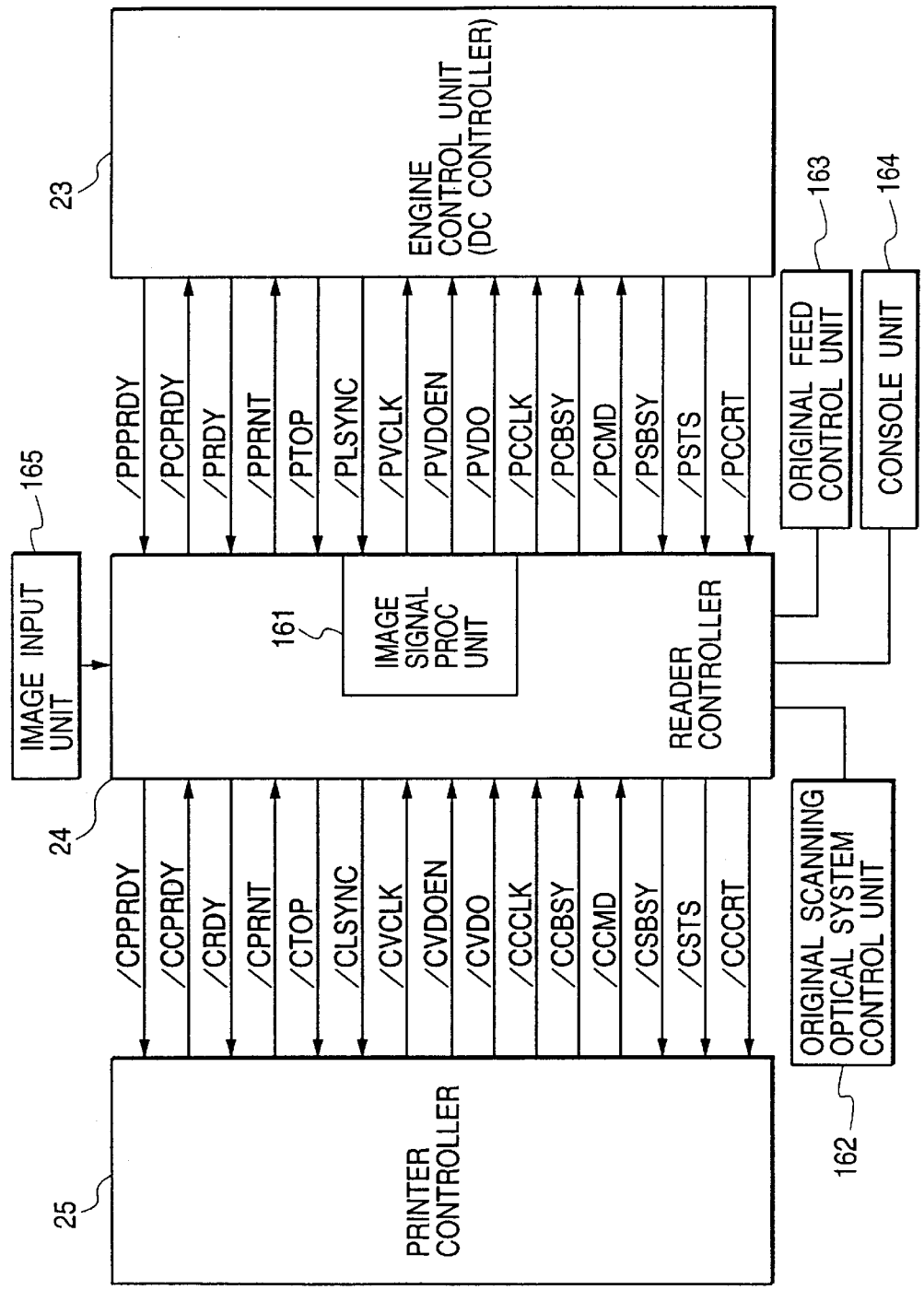
FIG. 16 is a configuration diagram showing an electrical connection in which a reader controller for reading an original image is installed.

FIG. 16 is a configuration diagram showing an electrical connection when a reader controller for reading an original image in the configuration in which the printer controller 25 and the engine control unit 23 shown in FIG. 3 are provided.

In FIG. 16, 24 is a reader controller and is arranged between the electrical middle between the printer controller 25 and the engine control unit 23 shown in FIG. 3. Signal lines between the printer controller 25 and the reader controller 24 and between the engine control unit 23 and the reader controller 24 have the same functions as the signal lines shown in FIG. 3 described previously. However, because the signals on the side of the printer controller 25 physically differ from those on the side of the engine control unit 23, the names of the signals are distinguished by assigning C to the former and P to the latter.

Further, 161 is an image signal proc unit inside the reader controller 24 and 162 is an original scanning optical system control unit which controls the optical reading unit 11. 163 is an original feed control unit which controls the original feed device 160. 164 is a console unit. 165 is an image input unit. The image signal converted by the photoelectric conversion unit 14 is input from the image input unit 165 and transferred to the image signal proc unit 161 inside the reader controller 24.

Figure 17:
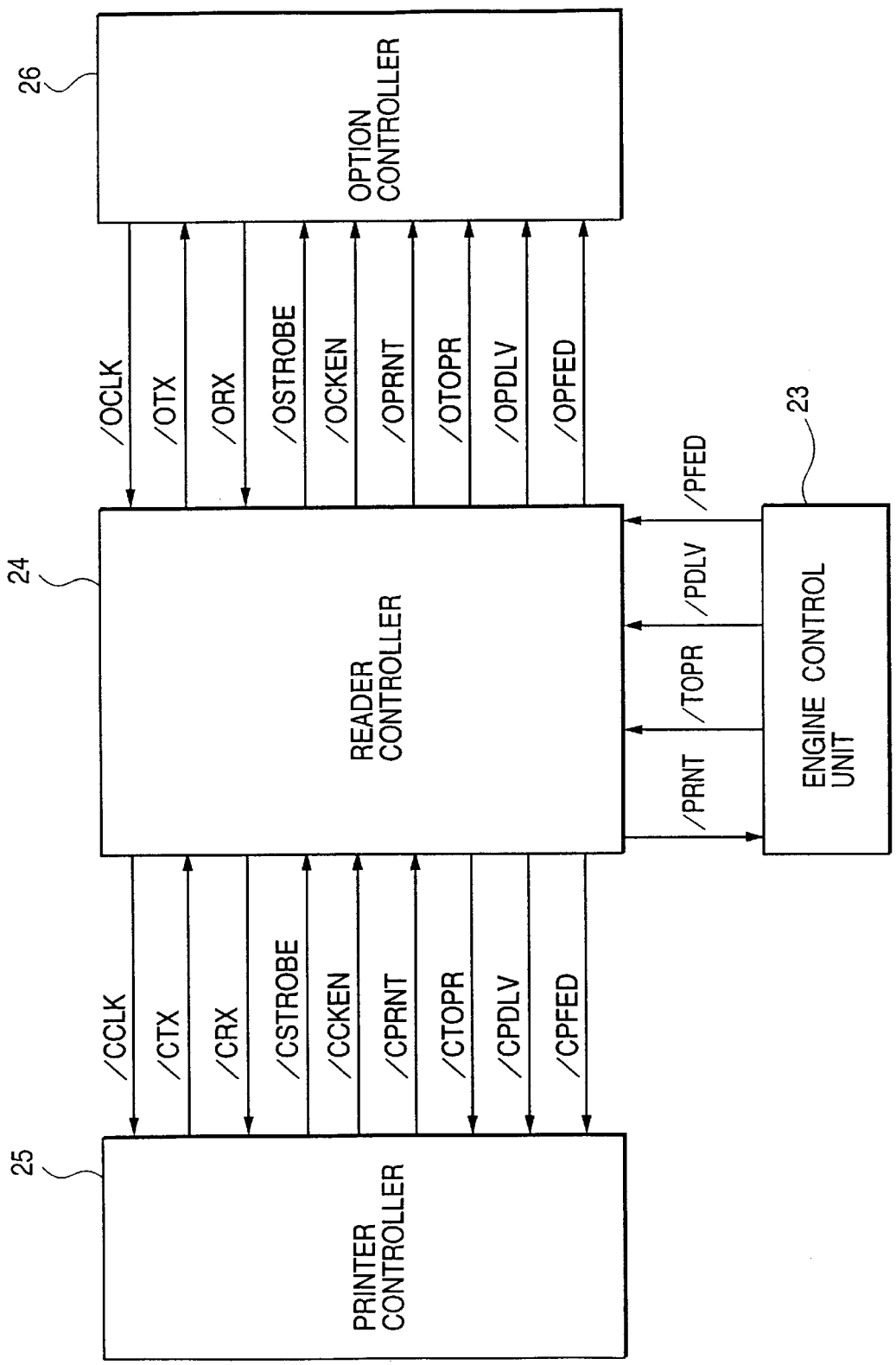
FIG. 17 is a block diagram showing an electrical configuration in which a reader controller 24 is installed.

FIG. 17 is a block diagram showing an electrical connection in which the reader controller 24 is installed in the configuration between the printer controller 25 and the option controller 26 shown in FIG. 11 shown above.

The reader controller 24 is arranged in the electrical middle between the printer controller 25 and the engine control unit 26. The signal lines between the printer controller 25 and the reader controller and between the reader controller 24 and the option controller 26 have the same functions as those shown in FIG. 11 described previously. However, because the signals on the side of the printer controller 25 physically differ from those on the side of the option controller 26, the names of the signals are distinguished by assigning C to the former and P to the latter.

Figure 18:
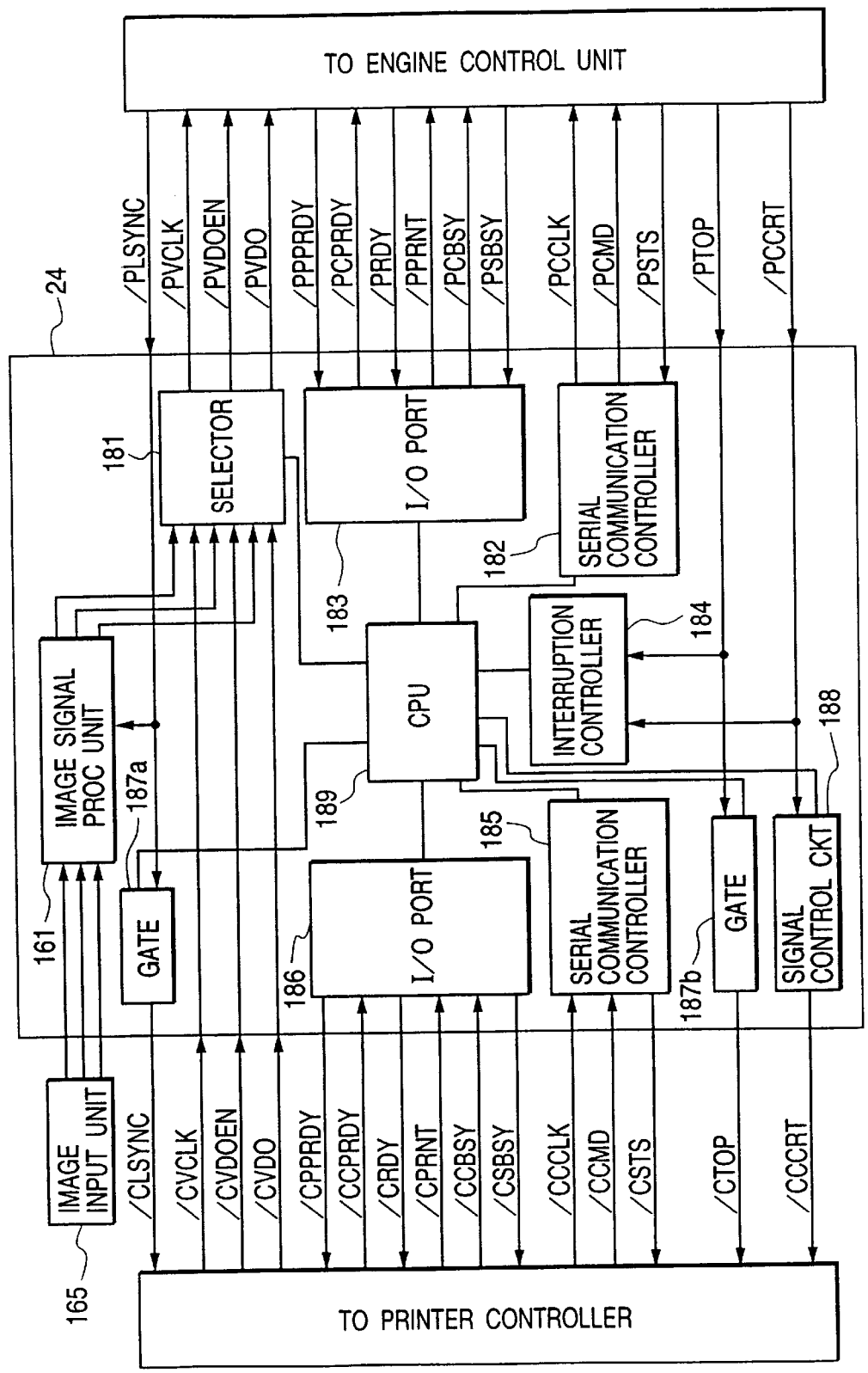
FIG. 18 is a block diagram showing the configuration inside a reader controller 24.

Next, the configuration inside the reader controller 24 is shown in FIG. 18.

In FIG. 18, 181 is a selector. The selector selects either an output of the image signal proc unit 161 or a signal sent from the printer controller 25 and outputs it to the engine control unit 23. The signal system switched by the selector 181 consists of the following three signals video clock (/VCLK), video enable (/VDOEN) and video data (/VDO).

182 is a serial communication controller which performs the communication between the engine control unit 23 and the option controller 26. 183 is an I/O port which exchanges a signal to compensate the communication in the communication controller 182. 184 is an interruption controller. The image top request signal (/PTOP) and the printer condition change signal (/PCCRT) are input to the interruption controller 184. 185 is a serial communication controller which performs the communication with the printer controller 25.

186 is an I/O port which exchanges a signal to compensate the communication in the communication controller 185. 187a, 187b are gates and control whether to send the signal sent from the printer to the printer controller 25. The gates 187a, 187b control the image top request signal (/TOP) and the line synchronous signal (/LSYNC).

188 is a signal control circuit having a gate function and a flag set function and controls the printer condition change signal (/CCRT). By opening and closing a gate, whether to transmit the printer condition change signal (/PCCRT) the engine control unit 23 issues to the printer controller 25 or by setting a flag, the printer condition change signal (/CCRT) can be issued from the reader controller 24 to the printer controller 25. Besides, 189 is a CPU which controls the entire.

[Copy Operation]

The method for reading a full color original image and outputting it from a color image formation device using these is described.

When the copy start key not illustrated on the console unit 164 is input after various copy conditions including a size of recording paper and the number of sheets of recording paper are set by the operation of various keys, the reader controller 24 closes the gate units 187a, 187b and the signal control circuit 188 or sets the selector 181 so that an output of the image signal proc unit 161 can be selected for the purpose of the copy mode. Subsequently, the printer ready condition signal (/PRDY) is checked for the engine control unit 23 using the I/O port 186.

Next, various settings are performed using the serial communication controller 182. First, a command which designates the sheet feed step for recording paper is issued.

Further, a command which requests a size of the recording paper on a designated cassette is issued. The engine control unit 23 returns the corresponding status to a series of these commands.

Subsequently, a sheet discharge port is decided with a command which designates the sheet discharge port and a page mode designation command which designates how many pages of images are formed is issued. Finally, by issuing a command which designates the monochrome or color mode, all settings on the side of the printer are completed.

If the option device 120 is connected, data such as a sheet feed port, a sheet discharge port and a sheet size which correspond to one print page is further written in the carrying condition management area 141 described previously using the serial communication controller 182.

After an original is fed onto an original stand by the original feed device 160, the reader controller 24 generates the print request (/PPRNT signal) to the engine control unit 23. In response to this, the /PTOP signal is returned from the engine control unit 23 after a predetermined time. This is processed by the interruption controller 184 and the optical reading device 11 is operated so as to synchronize with the /PTOP signal. By making the vertical scanning direction synchronize with this /PTOP signal and the horizontal direction synchronizing with the /PLSYNC signal, then the /PVDO signal synchronize with /PVCLK, the signal input from the photoelectric conversion device 14 to the image signal proc unit 161 is transferred to the engine control unit 23. In this case, because the color mode is set, the optical reading device 11 is operated for four times and an image consisting of four colors C, M, Y and K is formed for the /PTOP signal which is generated for four times.

If the option device 120 is connected, in a predetermined period after the final /PTOP signal is generated, the /PFED signal is received from the engine control unit 23 and the reader controller 24 passes this signal through the option controller 26 as the /OPFED signal. When the reader controller detects the /PFED signal, it instructs the option controller 26 to carry a sheet to the engine control unit 23 using the serial communication controller 182. In response to this, the option controller 26 instructs the option sheet feed device 31 (FIG. 1) to carry a sheet.

Further, after the final /PTOP signal is generated, the /PPRNT signal restores High (False). Accordingly, the engine control unit 23 detects that a print request is completed and moves to postprocessing such as the cleaning operation of the intermediate transfer body . Furthermore, after the transferred recording paper passes through the fusing roller, it is discharged to the specified sheet discharge port.

If the option sorter 32 (FIG. 1) is connected, the option controller 26 controls the option sorter 32 so as to discharge a sheet to the specified bin of the option sorter 32 according to the data of the discharge port set by the carrying condition management area described previously.

Finally, after the reader controller 24 checks no recording paper carrying condition (sheet discharge end) for the engine control unit 23, a print end occurs. After the reader controller executes the down sequence described previously, it waits in the ready condition until the next print request is generated.

[Print Operation]

Next, the method for outputting an image of the above printer controller 25 from a color image formation device is described.

When copy operation is completed, the reader controller 24 enters the ready condition. At this time, the reader controller releases the above gate units 187*a*, 187*b* and the signal control circuit 188 for the purpose of print operation. The reader controller 24 checks the printer ready state signal (/PRDY) for the engine control unit 23 using the I/O port 186. If the signal is acceptable (OK), the reader controller sets the printer ready signal (/CRDY) for the printer controller 25 using the I/O port 186.

Subsequently, the printer controller 25 communicates with a host computer to perform various settings including designation of a size of recording paper. The reader controller 24 receives them using the serial communication controller 185 and a CPU 189 interprets them. According to the contents, the reader controller 24 performs various settings using the serial communication controller 182 at this time. For a series of commands, the engine control unit 23 returns the corresponding status to the reader controller 24 and the reader controller 24 receives it using the serial communication controller 182. The CPU 189 interprets the received contents and the reader controller performs communication to the printer controller 25 using the serial communication controller 185 at this time.

If the option controller 26 is connected, the reader controller 24 receives the command from the printer 25 and the data set in the carrying condition management area 141 using the serial communication controller 185 and the CPU 189 interprets them. According to the contents, the reader controller 24 performs various settings using the serial communication controller 182 at this time. For a series of commands and the carrying condition management data, the option controller 26 returns the corresponding status and data to the reader controller 24 and the reader controller 24 receives them using the serial communication controller 182. The CPU 189 interprets the received contents and the reader controller performs communication to the printer controller 25 using the serial communication controller 185 at this time.

Subsequently, the printer controller 25 generates the printer request (/CPRNT signal) for the reader controller 24. The reader controller 24 receives it and generates the print request (/PPRNT signal) for the engine control unit 23. In response to this, the /PTOP signal is returned from the engine control unit 23 after a predetermined time. This passes through the signal control circuit 188 and is returned to the reader controller 24 as the /CTOP signal.

The reader controller 24 makes the vertical scanning direction synchronize with the /CTOP signal. Further, the /PLSYNC signal makes the horizontal direction synchronize with the /CLSYNC signal which passes through the gate 187*a* and the /CVDO signal synchronize with /CVCLK and transfers them to the reader controller 24. In the reader controller 24, the selector 181 is set so as to select a signal sent from the printer controller 25 and the signal sent from the printer controller 25 is sent to the engine control unit 23 as /PVCLK, /PVDOEN or /PVDO.

If the option controller 26 is connected, when the reader controller 24 receives the /PFED signal from the engine control unit 23, it passes through the printer controller 25 as the /CPFED signal. The reader controller 24 receives an instruction which carries a sheet from the option sheet feed device 31 to the engine control unit 23 from the printer controller 25 using the serial communication controller 185. The CPU 189 interprets the instruction and transfers it to the option controller 26 using the serial communication controller 182.

[Difference between Print Operation and Copy Operation]

The difference between print operation and copy operation about the image sending timing is described here.

Although a detailed description about the configuration of the print controller 25 is omitted, it is internally provided with an image memory and the image data to be printed is previously provided there. Accordingly, for the image top request signal (/TOP signal) sent from the engine control unit 23, the time required until print data (/VDO) is output is only an electrical delay time.

Figure 19:
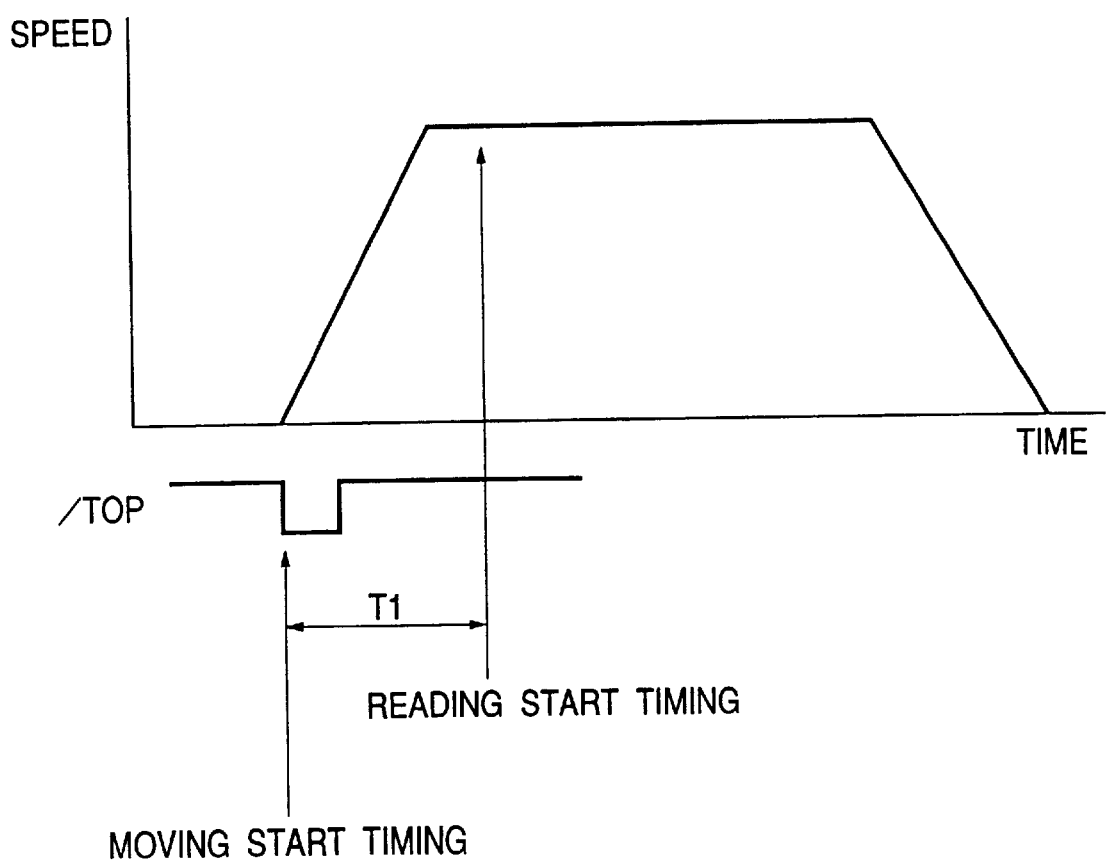
FIG. 19 is a diagram showing a timing difference at copy operation and print operation.

Conversely, in the copy mode, an original is read moving the optical reading device 11 and image data is output. As shown in FIG. 19, an acceleration time is required from the condition in which the optical reading device 11 to the condition in which it moves at a high speed at which the original is read, and it takes about several 100 ms, for example. Accordingly, if the engine control unit 23 issues the image top request signal (/TOP signal) in the copy mode at the same timing as the signal in the print mode, the time the print image data (/VDO) reaches the engine will be delayed by several 100 ms in the copy mode. Therefore, /TOP is issued at copy earlier than at print.

[Copy and Print Switching Output]

Next, the characteristic part of the present invention is described.

A color image formation device for which the present invention is executed can designate a print priority according to a function on the console unit 164 and for example, it can be set to any one of copy priority, printer priority and the same precedence between copy and printer priority.

The case where the same precedence is set to the output of copy and printer is described. If a notice of an image output is reported from the printer controller 25 through the serial communication controller 185 while copy is being executed in the color mode, the reader controller 24 judges that it enters the down sequence as is after copy is completed or such control that can continue the image formation sequence is performed to execute the output from the printer controller 25 without any delay.

Figure 20:
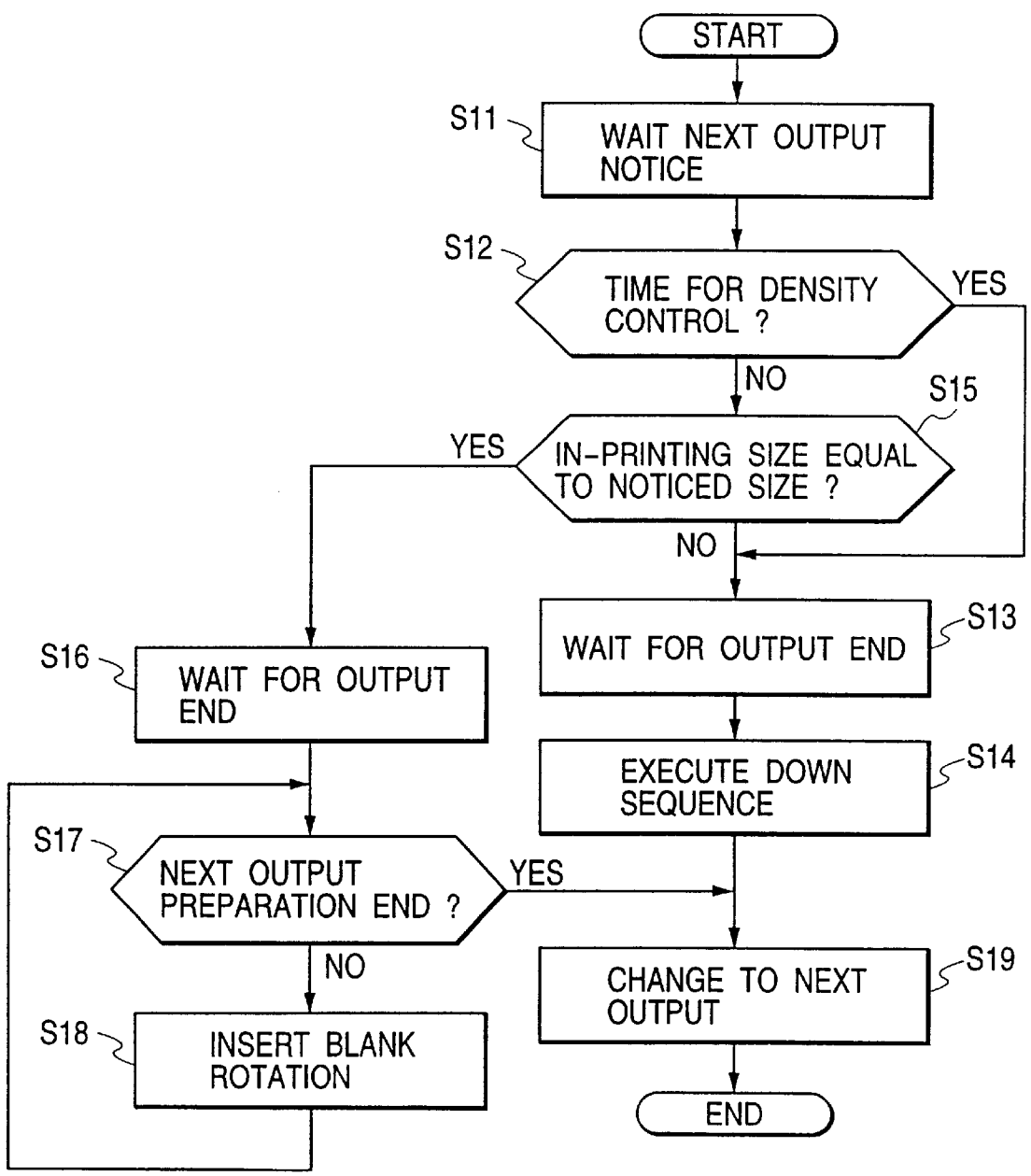
FIG. 20 is a flow chart showing the copy/print mode switching operation.

A flow of this judgment is shown in FIG. 20.

In FIG. 20, first, a print output notice is issued from the printer controller 25 through the serial communication controller 85 (Step S11). The reader controller 24 which receives a command judges whether it is time density control is necessary immediately before the image formation of a copy output is completed (Step S12).

Usually, for density control, the necessity of its execution is judged based on the total number of images formed and a humidity or temperature value, and the density control is executed at the end of copy as much as possible in consideration of the convenience of a user. Because the timing the user receives a product is not delayed by executing the density control at the end of copy, the productivity as a function need not be reduced. However, if image formation operation is kept long, the density control is not executed for a long period of time and the quality of an output image may be deteriorated. Therefore, if such judgment is passed, the density control must be executed even if the output request from the printer controller 25 is awaited. In this example device, the cumulative number of printouts is subject to the execution of density control. In other words, (1) when 50 sheets of printouts are executed after the power is started up regardless of black and white prints and color prints and (2) when 395 sheets of printouts for black and white prints and 95 sheets of printouts for color prints are executed after the density control is executed according to item (1), it is time the density control is necessary.

Accordingly, if the time a new output is issued is the time the execution of density control is necessary, processing is on standby until the copy being executed currently is completed (Step S13). Before the print operation which conforms to the next output notice, processing enters the down sequence and continuously performs density control and cleaning operation (Step S14).

If the time density control is to be executed is not reached, whether the size of an image being output at copy and that for which the output is requested from the printer controller 25 are the same is judged (Step S15). When the printer controller 25 issues an output notice in the above Step 11, it also transmits an output image and an output mode to the reader controller 24 via the communication at the same time. If an output image size differs, because the image formation area on the photosensitive drum 82 and the intermediate transfer body 85 (FIG. 5) differs, cleaning must be performed according to the image size at copy.

For the same size, after processing is on standby until the copy output being executed currently is completed (Step S16), it switches from the copy output to the printer output without executing the down sequence (Step S19) if an image is ready for being output from the printer (Step S19). Conversely, if the image is not ready for being immediately output from the printer (Step S17), processing is on standby by once inserting the blank rotation in which the photosensitive drum 82 and the intermediate transfer body 85 are simply rotated without forming an image for them without executing the down sequence (Step 18). Then, the blank rotation is inserted until the preparation for an image output from the printer is arranged and subsequently processing switches from the copy output to the printer output if the preparation for the image output is arranged (Step 19). Thus, as compared with the case where the down sequence is executed, the copy and printer output can be switched for a short time. In other words, as compared with the case where the photosensitive drum 82 stops rotating, by executing the blank rotation, the photosensitive drum 82 and the intermediate transfer body 85 can immediately be brought to the normal rotation for forming an image.

The number of blank rotations to be inserted at switching can be calculated if it is known how long an output is enabled later after a printer notice is reached. In such case, the down sequence time and the blank rotation are compared, and the control in which no down sequence is executed only when the blank rotation time is shorter is also enabled and this can improve productivity more efficiently.

By storing the program which conforms to the flow chart shown in FIG. 20 in a storage inside the CPU 189 and operating it, the control method described above can be implemented.

Thus, according to this embodiment, if it is known before the end of image output operation that there is an output according to another image configuration function, so long as the down sequence such as cleaning operation and density control need not be inserted comparing the conditions of both output images, an attempt is made to insert the image formation operation or the blank rotation operation not including the cleaning and density control. Consequently, the operation switching time can be minimized and the productivity as a composite machine can be improved.

In the above description, the present invention is described using the switching from copy operation to print operation as an example. Conversely, this description can also apply to the switching of print operation to copy operation, and in another mode, for example, to the switching of an image generation source such as the switching from FAX receive operation to another print or copy operation.

In the example described above, an example in which the present invention applies at the switching between different jobs such as copy, print and FAX is detailed.

Figure 21:
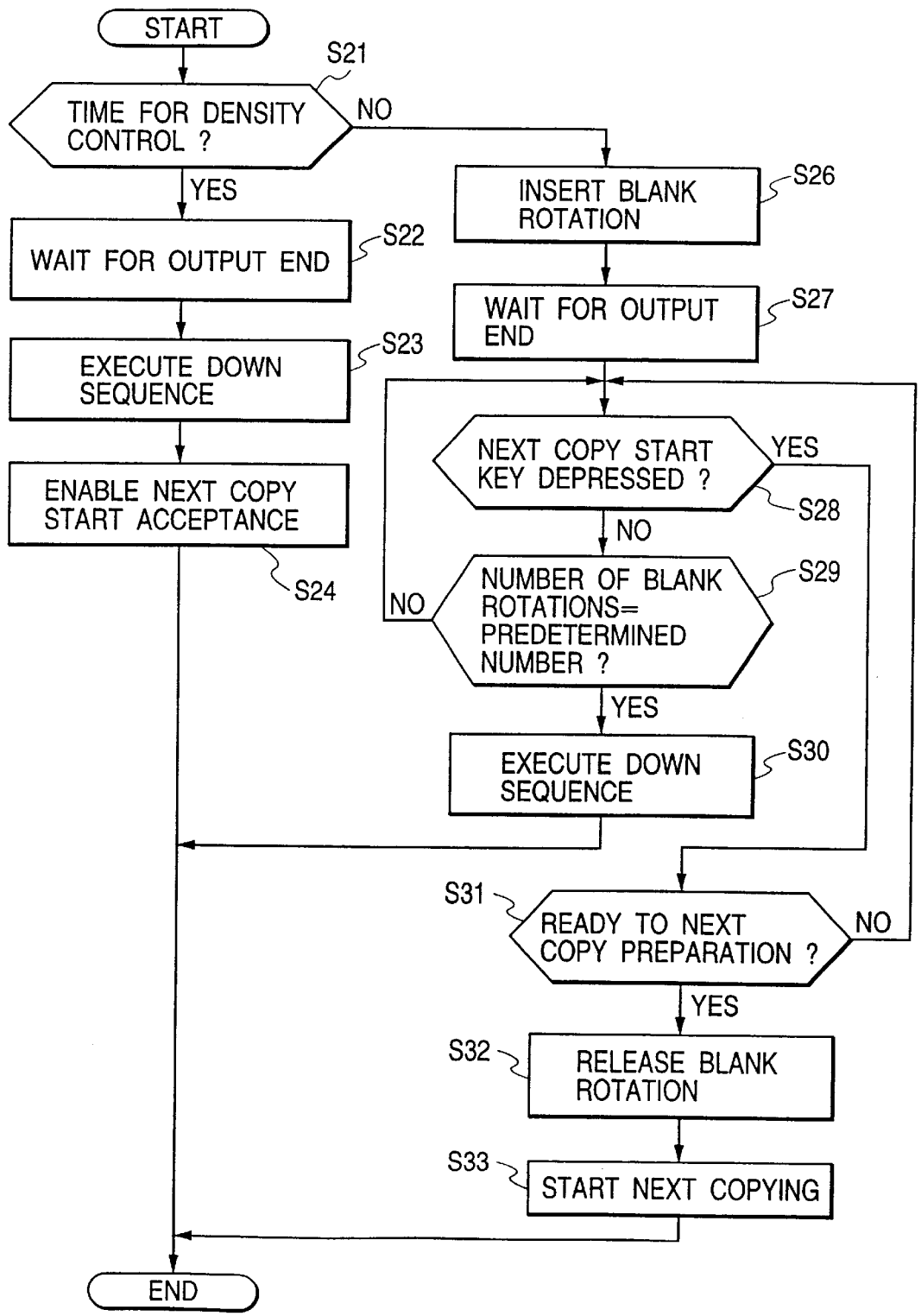
FIG. 21 is a flow chart showing the switching operation of a copy job.

Then, an example in which the present invention applies to the copy operation which is the same job is described. In the copy operation, the time until the copy operation of the next job after the final sheet for the copy operation of one job is discharged is started is important. This time is called SCOT (Second Copy Time) as a standard value representing the copy productivity of the second job and is highly valued from the aspect of easiness of use by a user. In particular, for a color copy, because the processing such as the cleaning after print operation must be performed more than a blank and white copy, there is a problem the SCOT is also prolonged for a black and white copying machine. This SCOT is shortened as follows:

The control operation of the reader controller 24 is described using the flow chart of FIG. 21.

The reader controller 24 at the end of copy operation first checks whether the execution time of density control which is the condition always requiring the down sequence is reached (Step S21). This judgment is performed as to whether the cumulative number of printouts reaches a predetermined number in the same manner as described above. For Yes, because density control processing need be performed at job end, the down sequence cannot be skipped. Accordingly, processing is on standby until the final output sheet is discharged outward (Step S22) and subsequently processing enters the down sequence and performs the density control and cleaning operation (Step S23). As described previously, the execution of this down sequence requires time, and this processing is required for maintaining image quality satisfactorily. After the end of the down sequence, the start of the next copy enters the acceptance enable condition (Step S24), then the printer is stopped.

Next, if the execution time of density control is not reached, that is to say, if No occurs in the above Step S21, the printer is instructed to insert blank rotation (Step S26). Then, processing is on standby until the final output sheet is discharged outward (Step S27) and depressing of the copy start key in the console unit 164 is judged (Step S28). At this time, although the printer is performing the blank rotation, the start of the next copy enters acceptance enable condition on the console unit 164. At this time, if the start of the next copy is not instructed (a user does not perform the operation of the copy start key), processing goes to Step S29. In Step S29, the number of blank rotations is counted and whether a predetermined number is reached is checked. If the predetermined number is not reached, processing returns to Step S28 described previously and the same check is repeated. Conversely, when the number of blank rotations reaches the predetermined number, processing enters the down sequence, density control and cleaning operation are performed and the printer is stopped. In the condition before the number of blank rotations reaches the predetermined number, only the operator panel can accept a copy and practically the printer is in the blank rotation condition. After the number of blank rotations reaches the predetermined number, the operator panel can accept a copy and moreover the printer itself stops the blank rotation and enters the standby condition. Besides, in the processing of Step S29, the number of insertions for the blank rotation until processing enters the down sequence is restricted, and for example, according to the condition of the frequency of device use, a user can set and change the number of insertions.

Conversely, in Step S28 described previously, if the printer is in the condition of blank rotation and the operator panel enables a copy start, when a user depresses the copy start key, the reader unit 11 sets up an optical motor for performing lamp lighting and document scan and at the same time checks whether the processing is completed, then judges whether the preparation for the next copy is completed (OK) (Step S31). If the preparation is not OK (completed), processing returns to Step S28 described previously without starting copy operation. Conversely, if the preparation for the next copy is OK (completed), to release the blank rotation condition the printer continues, an instruction of blank rotation release is issued to the printer (Step S32). Then, as soon as a synchronous signal is reached from the printer, processing enters the normal print condition and the next copy operation is started (Step S33). Thus, the operation of the next copy can be started so as to skip the down sequence.

The operation of FIG. 21 is described assuming that the check as to whether the size being output in Step S15 of FIG. 20 and the size of the next job are equal is omitted and the printer can skip the down sequence even if the output size is not equal. Needless to say, in the same manner as FIG. 20, control may also be executed by including the match and mismatch of the size in the judgment of the execution of down sequence.

The present invention is not restricted to a device according to the embodiment described above and may also apply a system comprising a plurality of units and a device consisting of one unit. Needless to say, the storage medium storing the program code of software which implements the function of the embodiment described previously is also supplied to a system or device and the system or device can also be completed when the computer (or CPU 189 or MPU) reads and executes the program code stored in the storage medium.

In this case, the program code itself read from a storage medium implements the function of the embodiment described previously and the storage medium storing the program code comprises the present invention. As storage media for supplying the program code, for example, a floppy disc, hard disc, optical disc, magneto-optical disc, CD-ROM, CD-R, magnetic tape, nonvolatile memory card and ROM can be used. Further, by executing the read program code a computer reads, the function of the embodiment described previously is not only implemented, but also based on the instruction of the program code, the OS running on the computer performs part or all of practical processing. Needless to say, the case where the function of the embodiment described previously is implemented by the processing is also included.

Further, after the program code read from a storage medium is written in the memory installed in a function extended board inserted in a computer and a function extended unit connected to the computer, the CPU which installs the extended function in the function extended board and the function extended unit performs part or all of practical processing on the basis of the instruction of the next program code. Needless to say, the case where the function of the embodiment described previously is implemented by the processing is also included.

The present invention is described above using the desirable example configuration, but needless to say, the present invention is not restricted to this and enables various modifications and changes within the claims.

What is claimed is:

1. An image formation device, comprising:
   image forming means which forms an image in a transfer formal;
   down sequence executing means which executes a predetermined down sequence to make the image formation device ready for a next image formation by the image forming means after an end of an image formation operation when a predetermined condition is not satisfied; and blank rotation executing means which executes a blank rotation that is a sequence not including the down sequence after the end of the image formation operation, the blank rotation being executed instead of executing the down sequence when the predetermined condition is satisfied.

2. An image formation device according to claim 1, wherein the image forming means can form an image from different image generation sources, and a determination of whether an image formation operation switches from using a first image generation source to using a second image generation source being based on whether the predetermined condition is satisfied.

3. An image formation device according to claim 2, wherein the predetermined condition is that a size of the image formed using the first image generation source is equal to a size of the image formed using the second image generation source.

4. An image formation device according to claim 1, wherein the down sequence includes a cleaning operation inside the device and a density control for stabilizing an output density of the device.

5. An image formation device according to claim 4, wherein the blank rotation is a sequence not including the cleaning operation inside the device and the density control for stabilizing the output density of the device.

6. An image formation device according to claim 1, further comprising image formation operation restarting means which restarts an image formation operation after the blank rotation.

7. An image formation method, comprising the steps of:
performing image formation processing by using image forming means to form an image in a transfer format;
when a predetermined condition is not satisfied, performing down sequence execution processing to execute a predetermined down sequence to prepare for a next image formation processing operation by the image forming means after an end of an image formation operation; and
when the predetermined condition is satisfied, performing blank rotation execution processing to execute a blank rotation that is a sequence not including the down sequence after the end of the image formation operation.

8. An image formation method according to claim 7, wherein the image forming means can form an image from different image generation sources, and a determination of whether an image formation operation switches from using a first image generation source to using a second image generation source is based on whether the predetermined condition is satisfied.

9. An image formation method according to claim 8, wherein the predetermined condition is that a size of the image formed using the first image generation source is equal to a size of the image formed using the second image generation source.

10. An image formation method according to claim 7, wherein the down sequence includes a cleaning operation and a density control for stabilizing an output density, both of which pertain to the image forming means.

11. An image formation method according to claim 10, wherein the blank rotation is a sequence not including the cleaning operation and the density control for stabilizing the output density.

12. An image formation method according to claim 7, further comprising the step of performing image formation operation restart processing by using image formation operation restarting means to restart an image formation operation after the blank rotation.

13. An image formation system, comprising:
a data sender for sending image data; and
an image formation device having image forming means, down sequence executing means, and blank rotation executing means;
wherein the image forming means is operable to form an image using the image data sent from the data sender in a transfer format, and the down sequence executing means is operable to execute a predetermined down sequence to make the image formation device ready for a next image formation operation by the image forming means after an end of an image formation operation when a predetermined condition is not satisfied, and the blank rotation executing means is operable to execute a blank rotation that is a sequence not including the down sequence after the end of the image formation operation when the predetermined condition is satisfied.

14. An image formation system according to claim 13, wherein the image forming means can form an image from different image generation sources, and a determination of whether an image formation operation switches from using a first image generation source to using a second image generation source being based on whether the predetermined condition is satisfied.

15. An image formation system according to claim 14, wherein the predetermined condition is that a size of the image formed using the first image generation source is equal to a size of the image formed using the second image generation source.

16. An image formation system according to claim 13, wherein the down sequence includes a cleaning operation inside the device and a density control for stabilizing an output density of the device.

17. An image formation system according to claim 16, wherein the blank rotation is a sequence not including the cleaning operation inside the device and the density control for stabilizing the output density of the device.

18. An image formation system according to claim 13, wherein said image formation device also has image formation operation restarting means which are operable to restart an image formation operation after the blank rotation.

19. A storage medium for storing a program which can be read by a computer and which implements an image formation method the method comprising the steps of:
performing image formation processing by using image forming means to form an image in a transfer format;
when a predetermined condition is not satisfied, performing down sequence execution processing to execute a predetermined down sequence to prepare for a next image formation processing operation by the image forming means after an end of an image formation operation; and
when the predetermined condition is satisfied, performing blank rotation execution processing to execute a blank rotation that is a sequence not including the down sequence after the end of the image formation operation.

20. A storage medium according to claim 19, wherein the image forming means can form an image from different image generation sources, and a determination of whether an image formation operation switches from using a first image generation source to using a second image generation source is based on whether the predetermined condition is satisfied.

21. A storage medium according to claim 20, wherein the predetermined condition is that a size of the image formed using the first image operation source is equal to a size of the image formed using the second image generation source.

22. An storage medium according to claim 19, wherein the down sequence includes a density control for stabilizing a cleaning operation and an output density, both of which pertain to the image forming means.

23. An storage medium according to claim 22, wherein the blank rotation is a sequence not including the density control for stabilizing the cleaning operation and the output density.

24. An storage medium according to claim 19, wherein the image formation method further comprises the step of performing image formation operation restart processing by using image formation operation restarting means to restart an image formation operation after the blank rotation.

* * * * *

UNITED STATES PATENT AND TRADEMARK OFFICE
CERTIFICATE OF CORRECTION

PATENT NO. : 6,226,470 B1
DATED : May 1, 2001
INVENTOR(S) : Hideto Kohtani et al.

It is certified that error appears in the above-identified patent and that said Letters Patent is hereby corrected as shown below:

Drawings,
Fig 4, Sheet 3, "IVIDEO" should read -- VIDEO --;
Fig. 8, Sheet 7, "FU" should read -- FOR --;
Fig. 21, Sheet 19, "TO" should read -- FOR --.

Column 1,
Line 37, "ten" should read -- tens of --;
Line 39, "printer" should read -- printer job --;
Line 40, "a switching continuous" should read -- continuous switching --.

Column 2,
Line 12, "Besides" should read -- Also --.

Column 3,
Line 61, "unit 11" should read -- unit 21. --.

Column 4,
Line 52, "printer engine 25" should read -- printer engine 62 --;
Line 55, "printer engine 25" should read -- printer engine 62 --.

Column 6,
Line 12, "is reached" should read -- reaches --;
Line 42, "every colors" should read -- for each color toner --;
Line 52, "be" should read -- may be --.

Column 7,
Line 3, "Y." should read -- Y, --;
Line 61, "which" should read -- the --.

Column 8,
Line 2, "an" should read -- a --;
Line 62, "option cassette deck 23" should read -- sheet feed cassette deck 31 --; and "stesorter 32." should read -- sorter 32. --.

Column 9,
Line 17, "CLK". should read -- /CLK --;
Line 23, "write" should read -- writes --.
Line 42, "instruct" should read -- instructs --.

UNITED STATES PATENT AND TRADEMARK OFFICE
CERTIFICATE OF CORRECTION

PATENT NO.    : 6,226,470 B1
DATED         : May 1, 2001
INVENTOR(S)   : Hideto Kohtani et al.

It is certified that error appears in the above-identified patent and that said Letters Patent is hereby corrected as shown below:

Column 10,
Line 3, "RX" should read -- /RX --;
Line 4, "send and receive" should read -- sent and received --;
Line 42, "126." and should read -- 26. --

Column 11,
Line 8, "TOPR" should read -- /TOPR --.

Column 12,
Line 25, "signals" should read -- signals: --; and "(/VCLK)," should read -- (/CVCLK), --;
Line 26, "(/VDOEN)," should read -- (/CVDOEN) --; and "(/VDO)." should read -- (/CVDO). --;
Line 40, "(/TOP)" should read -- (/PTOP) --;
Line 41, " (/LSYNC)." should read -- (/PLYSNC). --;
Line 44, (/CCRT)." should read -- (/PCCRT) --.

Column 13,
Line 38, "/OPFED" should read -- /PFED --.

Column 14,
Line 67, "about" should read -- in reference to --.

Column 15,
Line 40, "85" should read -- 185 --.

Column 16,
Line 65, "In the" should read -- The --;
Line 66, "applies at the switching" should read -- switches --.

Column 17,
Line 22, "be" should read -- to be --.

Column 18,
Line 7, "an" should read -- and an --.
Line 65, "formal" should read -- format --.

Column 20,
Line 50, "method the" should read -- method, the --.

UNITED STATES PATENT AND TRADEMARK OFFICE
CERTIFICATE OF CORRECTION

PATENT NO. : 6,226,470 B1
DATED : May 1, 2001
INVENTOR(S) : Hideto Kohtani et al.

It is certified that error appears in the above-identified patent and that said Letters Patent is hereby corrected as shown below:

Column 21,
Line 8, "An" should read -- A --.

Column 22,
Line 1, "An" should read -- A --.
Line 5, "An" should read -- A --.

Signed and Sealed this

Eighteenth Day of June, 2002

Attest:

JAMES E. ROGAN
Attesting Officer     Director of the United States Patent and Trademark Office